United States Patent
Lomet et al.

(10) Patent No.: US 10,216,629 B2
(45) Date of Patent: Feb. 26, 2019

(54) LOG-STRUCTURED STORAGE FOR DATA ACCESS

(71) Applicant: Microsoft Technology Licensing, LLC, Redmond, WA (US)

(72) Inventors: David B. Lomet, Redmond, WA (US); Justin Levandoski, Seattle, WA (US); Sudipta Sengupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/372,381

(22) Filed: Dec. 7, 2016

(65) Prior Publication Data

US 2017/0199818 A1   Jul. 13, 2017

Related U.S. Application Data

(63) Continuation of application No. 13/924,567, filed on Jun. 22, 2013, now Pat. No. 9,519,591.

(51) Int. Cl.
*G06F 12/12* (2016.01)
*G06F 12/0804* (2016.01)
(Continued)

(52) U.S. Cl.
CPC ...... *G06F 12/0804* (2013.01); *G06F 12/0815* (2013.01); *G06F 12/0891* (2013.01);
(Continued)

(58) Field of Classification Search
USPC ........................................................ 711/135
See application file for complete search history.

(56) References Cited

U.S. PATENT DOCUMENTS

| 4,945,474 A | 7/1990 | Elliott et al. |
| 5,043,866 A | 8/1991 | Myre et al. |

(Continued)

FOREIGN PATENT DOCUMENTS

| CN | 1522409 A | 8/2004 |
| CN | 103092905 A | 5/2013 |

(Continued)

OTHER PUBLICATIONS

Saldanha, et al., "Implementation of PALM: Parallel Architecture-Friendly Latch-Free Modifications to B+ Trees on Many-Core Processors", Retrieved from <<http://cs.nyu.edu/~lerner/spring12/Preso08-PALMTree.pdf>>, May 8, 2012, 8 Pages.

(Continued)

*Primary Examiner* — Mano Padmanabhan
*Assistant Examiner* — Jean C Edouard
(74) *Attorney, Agent, or Firm* — Rainier Patents, P.S.

(57) ABSTRACT

A data manager may include a data opaque interface configured to provide, to an arbitrarily selected page-oriented access method, interface access to page data storage that includes latch-free access to the page data storage. In another aspect, a swap operation may be initiated, of a portion of a first page in cache layer storage to a location in secondary storage, based on initiating a prepending of a partial swap delta record to a page state associated with the first page, the partial swap delta record including a main memory address indicating a storage location of a flush delta record that indicates a location in secondary storage of a missing part of the first page. In another aspect, a page manager may initiate a flush operation of a first page in cache layer storage to a location in secondary storage, based on atomic operations with flush delta records.

20 Claims, 14 Drawing Sheets

(51) Int. Cl.
  *G06F 16/22* (2019.01)
  *G06F 16/23* (2019.01)
  *G06F 12/0891* (2016.01)
  *G06F 12/0815* (2016.01)
  *G06F 12/1009* (2016.01)
  *G06F 12/123* (2016.01)

(52) U.S. Cl.
  CPC ........ *G06F 12/1009* (2013.01); *G06F 12/123* (2013.01); *G06F 16/2246* (2019.01); *G06F 16/2315* (2019.01); *G06F 12/12* (2013.01); *G06F 2212/60* (2013.01); *G06F 2212/621* (2013.01)

(56) References Cited

U.S. PATENT DOCUMENTS

| | | |
|---|---|---|
| 5,123,104 A | 6/1992 | Levine et al. |
| 5,212,788 A | 5/1993 | Lomet et al. |
| 5,247,672 A | 9/1993 | Mohan |
| 5,317,731 A | 5/1994 | Dias et al. |
| 5,335,343 A | 8/1994 | Lampson et al. |
| 5,440,727 A * | 8/1995 | Bhide ............... G06F 17/30578 707/999.01 |
| 5,546,579 A | 8/1996 | Josten et al. |
| 5,761,132 A | 6/1998 | Kim |
| 5,761,660 A | 6/1998 | Josten et al. |
| 5,781,910 A | 7/1998 | Gostanian et al. |
| 5,845,292 A | 12/1998 | Bohannon et al. |
| 5,870,758 A | 2/1999 | Bamford et al. |
| 5,870,763 A | 2/1999 | Lomet |
| 5,966,706 A | 10/1999 | Biliris et al. |
| 5,983,015 A | 11/1999 | Lee et al. |
| 6,085,200 A | 7/2000 | Hill et al. |
| 6,185,699 B1 | 2/2001 | Haderle et al. |
| 6,282,605 B1 | 8/2001 | Moore |
| 6,385,712 B1 * | 5/2002 | Campbell ........... G06F 12/1036 711/206 |
| 6,581,132 B1 | 6/2003 | Kakinuma et al. |
| 6,978,279 B1 | 12/2005 | Lomet et al. |
| 7,039,773 B2 | 5/2006 | Hu et al. |
| 7,065,537 B2 | 6/2006 | Cha et al. |
| 7,139,781 B2 * | 11/2006 | Young ............... G06F 17/30067 707/657 |
| 7,293,028 B2 | 11/2007 | Cha et al. |
| 7,305,421 B2 | 12/2007 | Cha et al. |
| 7,383,389 B1 | 6/2008 | Bumbulis |
| 7,426,559 B2 | 9/2008 | Hamel et al. |
| 7,472,139 B2 | 12/2008 | Nishikawa et al. |
| 7,747,589 B2 | 6/2010 | Lomet |
| 7,962,693 B1 | 6/2011 | Bumbulis |
| 8,019,938 B2 * | 9/2011 | Flynn ..................... G06F 1/183 711/113 |
| 8,150,893 B2 | 4/2012 | Bohannon et al. |
| 8,165,988 B2 | 4/2012 | Shau et al. |
| 8,170,997 B2 | 5/2012 | Lomet et al. |
| 8,244,667 B1 | 8/2012 | Weinberger et al. |
| 8,589,341 B2 | 11/2013 | Golde et al. |
| 8,868,514 B2 | 10/2014 | Lomet et al. |
| 9,003,162 B2 | 4/2015 | Lomet et al. |
| 2002/0138446 A1 | 9/2002 | Antonin et al. |
| 2003/0033328 A1 | 2/2003 | Cha et al. |
| 2003/0061537 A1 * | 3/2003 | Cha ..................... G06F 11/1471 714/16 |
| 2003/0204698 A1 * | 10/2003 | Sachedina ........... G06F 12/0806 711/170 |
| 2003/0208464 A1 | 11/2003 | Lee et al. |
| 2004/0260726 A1 | 12/2004 | Hrle et al. |
| 2006/0004839 A1 | 1/2006 | Nagasawa et al. |
| 2006/0167960 A1 | 7/2006 | Lomet |
| 2006/0253502 A1 | 11/2006 | Raman et al. |
| 2007/0011105 A1 | 1/2007 | Benson et al. |
| 2007/0112885 A1 | 5/2007 | Farr |
| 2007/0130114 A1 * | 6/2007 | Li ........................ G06F 8/4442 |
| 2007/0239758 A1 | 10/2007 | Devine et al. |
| 2007/0282848 A1 | 12/2007 | Kiilerich et al. |
| 2008/0065670 A1 | 3/2008 | Cha et al. |
| 2008/0288715 A1 | 11/2008 | Maddali et al. |
| 2009/0240664 A1 | 9/2009 | Dinker et al. |
| 2010/0030818 A1 | 2/2010 | Cooper et al. |
| 2010/0042776 A1 | 2/2010 | Seo et al. |
| 2010/0049704 A1 * | 2/2010 | Sumiya ................. G01C 21/26 707/724 |
| 2010/0049940 A1 * | 2/2010 | Ware ................. G06F 12/0292 711/203 |
| 2010/0191713 A1 | 7/2010 | Lomet et al. |
| 2010/0191919 A1 | 7/2010 | Bernstein et al. |
| 2010/0281203 A1 | 11/2010 | Bae et al. |
| 2011/0055458 A1 | 3/2011 | Kuehne |
| 2011/0078367 A1 | 3/2011 | Minkin et al. |
| 2011/0179000 A1 | 7/2011 | Shaughnessy |
| 2011/0252000 A1 | 10/2011 | Diaconu et al. |
| 2011/0276781 A1 * | 11/2011 | Sengupta ............ G06F 12/0862 711/216 |
| 2012/0005168 A1 * | 1/2012 | Lomet ................. G06F 11/1471 707/683 |
| 2012/0072652 A1 * | 3/2012 | Celis ..................... G06F 12/121 711/103 |
| 2012/0131038 A1 * | 5/2012 | Aronovich .......... G06F 11/1435 707/769 |
| 2012/0203805 A1 | 8/2012 | Lee et al. |
| 2012/0210021 A1 | 8/2012 | Flynn et al. |
| 2013/0110767 A1 | 5/2013 | Tatemura et al. |
| 2013/0339312 A1 | 12/2013 | Schreter |
| 2013/0346725 A1 | 12/2013 | Lomet et al. |
| 2014/0149527 A1 | 5/2014 | Lee et al. |
| 2016/0019279 A1 | 1/2016 | Sengupta et al. |
| 2016/0110403 A1 | 4/2016 | Lomet et al. |

FOREIGN PATENT DOCUMENTS

| | | |
|---|---|---|
| CN | 103493027 A | 1/2014 |
| EP | 0465018 B1 | 5/1997 |
| JP | 2002524801 A | 8/2002 |
| JP | 2007012061 A | 1/2007 |
| JP | 2010218529 A | 9/2010 |
| WO | 2014205298 A1 | 12/2014 |
| WO | 2016064575 A1 | 4/2016 |

OTHER PUBLICATIONS

Salles, et al., "An Evaluation of Checkpoint Recovery for Massively Multiplayer Online Games", In Proceedings of the VLDB Endowment, vol. 2, Issue 1, Aug. 2009, 12 Pages.

Sears, et al., "bLSM: A General Purpose Log Structured Merge Tree", In Proceedings of the ACM SIGMOD International Conference on Management of Data, May 20, 2012, pp. 217-228.

Sears, et al., "Segment-Based Recovery: Write-Ahead Logging Revisited", In Proceedings of the VLDB Endowment, vol. 2, Issue 1, Aug. 24, 2009, 12 Pages.

Sears, et al., "Stasis: Flexible Transactional Storage", In Proceedings of the 7th Symposium on Operating Systems Design and Implementation, Nov. 6, 2006, pp. 29-44.

Sewall, et al., "PALM: Parallel Architecture-Friendly Latch-Free Modifications to B+ Trees on Many-Core Processors", In Proceedings of the Very Large Data Bases Endowment, vol. 4, No. 11, Aug. 29, 2011, 12 Pages.

Stonebraker, et al., "One Size Fits All: An Idea Whose Time Has Come and Gone", In Proceedings of the 21st International Conference on Data Engineering, Apr. 5, 2005, 10 Pages.

Thomson, et al., "Calvin: Fast Distributed Transactions for Partitioned Database Systems", In Proceedings of the ACM SIGMOD International Conference on Management of Data, May 20, 2012, 12 Pages.

Vo, et al., "Towards Elastic Transactional Cloud Storage with Range Query Support", In Proceedings of the VLDB Endowment, vol. 3, Issue 1, Sep. 2010, 12 Pages.

Vogels, Werner, "Data Access Patterns in the Amazon.com Technology Platform", In Proceedings of the 33rd International Conference on Very large Data Bases, Sep. 23, 2007, 1 Page.

(56) References Cited

OTHER PUBLICATIONS

Wei, et al., "CloudTPS: Scalable Transactions for Web Applications in the Cloud", In Proceedings of the IEEE Transactions on Services Computing, vol. 5, Issue 4, Feb. 15, 2010, 44 Pages.
Wei, et al., "Scalable Transactions for Web Applications in the Cloud", Proceedings of the 15th International Euro-Par Conference on Parallel, Aug. 25, 2009, 12 Pages.
"Second Written Opinion Issued in PCT Application No. PCT/US2014/043299", dated May 26, 2015, 9 Pages.
"Office Action Issued in Mexican Patent Application No. MX/a/2015/017630", dated Mar. 22, 2017, 2 Pages. (W/o English Translation).
Request for Examination and Voluntary Amendment filed Jun. 13, 2017 in Japanese Patent Application No. 2016-521827, 11 Pages.
Kossmann, et al., "An Evaluation of Alternative Architectures for Transaction Processing in the Cloud", In Proceedings of ACM SIGMOD International Conference on Management of Data, Jun. 6, 2010, 12 Pages.
Kraska, et al., "Consistency Rationing in the Cloud: Pay only when it Matters", In Proceedings of the Very Large Data Bases Endowment, vol. 2, Issue 1, Aug. 24, 2009, 12 Pages.
Kung, et al., "Concurrent Manipulation of Binary Search Trees", In Journal ACM Transactions on Database Systems, vol. 5 Issue 3, Sep. 1, 1980, pp. 354-382.
Larson, et al., "High-Performance Concurrency Control Mechanisms for Main-Memory Databases", In Proceedings of the Very Large Data Bases Endowment, vol. 5, Issue 4, Aug. 27, 2012, pp. 298-309.
Lee, et al., "Design of Flash-Based DBMS: An In-Page Logging Approach", In Proceedings of the ACM SIGMOD International Conference on Management of Data, Jun. 12, 2007, pp. 55-66.
Lehman, et al., "Efficient Locking for Concurrent Operations on B-Trees", In Journal ACM Transactions on Database Systems, vol. 6, Issue 4, Dec. 1981, pp. 650-670.
Levandoski, et al., "Deuteronomy: Transaction Support for Cloud Data", In 5th Biennial Conference on Innovative Data Systems Research, Jan. 9, 2011, 11 Pages.
Levandoski, et al., "Indexing on Modern Hardware: Hekaton and Beyond", In Proceedings of ACM SIGMOD International Conference on Management of Data, Jun. 22, 2014, pp. 717-720.
Levandoski, et al., "LLAMA: A Cache/Storage Subsystem for Modern Hardware", In Proceedings of the VLDB Endowment, vol. 6, Issue 10, Aug. 26, 2013, 12 Pages.
Levandoski, et al., "The Bw-Tree: A B-tree for New Hardware Platforms", In Proceedings of the 29th IEEE International Conference on Data Engineering, Apr. 8, 2013, 12 Pages.
Lomet, et al., "A Theory of Redo Recovery", In Proceedings of the ACM SIGMOD International Conference on Management of Data, Jun. 9, 2003, 10 Pages.
Lomet, David, "Advanced Recovery Techniques in Practice", In Recovery Mechanisms in Database Systems, Prentice Hall Ptr, Dec. 5, 1996, 13 Pages.
Lomet, et al., "Concurrency and Recovery for Index Trees", In Journal Very Large Data Bases, vol. 6, Issue 3, Aug. 8, 1997, pp. 224-240.
Lomet, David B., "Grow and Post Index Trees: Roles, Techniques and Future Potential", In Proceedings of the Second International Symposium on Advances in Spatial Databases, Aug. 28, 1991, 24 Pages.
Lomet, et al., "Implementing Performance Competitive Logical Recovery", In Proceedings of the VLDB Endowment, vol. 4, Issue 7, Aug. 29, 2011, pp. 430-439.
Lomet, David B., "Key Range Locking Strategies for Improved Concurrency", In Proceedings of the 19th International Conference on Very Large Data Bases, Aug. 24, 1993, pp. 655-664.
Lomet, et al., "Locking Key Ranges with Unbundled Transaction Services", In Proceedings of the VLDB Endowment, vol. 2, Issue 1, Aug. 24, 2009, 12 Pages.
Lomet, et al., "Logical Logging to Extend Recovery to New Domains", In Proceedings of the ACM SIGMOD International Conference on Management of Data, Jun. 1999, 12 Pages.
Lomet, David B., "MLR: A Recovery Method for Multi-Level Systems", In Proceedings of the ACM SIGMOD International Conference on Management of Data, Jun. 2, 1992, pp. 185-194.
Lomet, et al., "Multi-Version Concurrency via Timestamp Range Conflict Management", In Proceedings of IEEE 28th International Conference on Data Engineering, Apr. 1, 2012, 12 Pages.
Lomet, David B., "Persistent Applications Using Generalized Redo Recovery", In Proceeding of IEEE 14th International Conference on Data Engineering, Feb. 23, 1998, pp. 154-163.
Lomet, David, "Persistent Middle Tier Components Without Logging", In Proceedings of the 9th International Database Engineering & Application Symposium, Jul. 25, 2005, 10 Pages.
Lomet, et al., "Redo Recovery after System Crashes", In Proceedings of the 21st International Conference on Very Large Data Bases, Sep. 11, 1995, pp. 457-468.
Lomet, David, "Robust Web Services via Interaction Contracts", In Proceedings of the 5th International Conference on Technologies for E-Services, Aug. 29, 2004, 14 Pages.
Lomet, David B., "The Case for Log Structuring in Database Systems", In Proceedings of the International Workshop on High Performance Transaction Systems, Sep. 1995, 5 Pages.
Lomet, David, "The Evolution of Effective B-tree Page Organization and Techniques: A Personal Account", In Newsletter ACM SIGMOD Record, vol. 30, Issue 3, Sep. 2001, 6 Pages.
Lomet, et al., "Unbundling Transaction Services in the Cloud", In 4th Biennial Conference on Innovative Data Systems Research (CIDR), Jan. 4, 2009, 10 Pages.
Mao, et al., "Cache Craftiness for Fast Multicore Key-Value Storage", In Proceedings of the 7th ACM European Conference on Computer Systems, Apr. 10, 2012, 14 Pages.
March, et al., "A Read-Only Distributed Hash Table", In Journal of Grid Computing, vol. 9, Issue 4, Apr. 27, 2011, pp. 501-529.
Michael, Maged M., "Hazard Pointers: Safe Memory Reclamation for Lock-Free Objects", In Proceedings of the IEEE Transactions on Parallel and Distributed Systems, vol. 15, Issue 6, Jun. 2004, 14 Pages.
Mohan, et al., "ARIES/IM: An Efficient and High Concurrency Index Management Method Using Write-Ahead Logging", In Proceedings of the ACM SIGMOD International Conference on Management of Data, vol. 21, Issue 2, Jun. 2, 1992, pp. 371-380.
Mohan, et al., "ARIES/CSA: A Method for Database Recovery in Client-Server Architectures", In Proceedings of the ACM SIGMOD International Conference on Management of Data, May 24, 1994, pp. 55-66.
Mohan, et al., "ARIES: A Transaction Recovery Method Supporting Fine-Granularity Locking and Partial Rollbacks Using Write-Ahead Logging", In Journal ACM Transactions on Database Systems, vol. 17, Issue 1, Mar. 1992, pp. 94-162.
Nyberg, et al., "AlphaSort: A Cache-Sensitive Parallel External Sort", In Journal the VLDB Journal—The International Journal on Very Large Data Bases, vol. 4, Issue 4, Oct. 1995, pp. 603-627.
O'Neil, et al., "The Log-Structured Merge-Tree (LSM-Tree)", In Journal Acta Informatica, vol. 33, Issue 4, Jun. 1, 1996, 32 Pages.
O'Neil, et al., "The LRU-K Page Replacement Algorithm for Database Disk Buffering", In Proceedings of the ACM SIGMOD International Conference on Management of Data, Jun. 1, 1993, pp. 297-306.
Pandis, et al., "PLP: Page Latch-free Shared-everything OLTP", In Proceedings of the Very Large Data Bases Endowment, vol. 4, Issue 10, Jul. 1, 2011, pp. 610-621.
Pandis, Ippokratis, "Scalable Transaction Processing through Data-oriented Execution", A Dissertation Submitted in Partial Fulfillment of the Requirements for the Degree of Doctor of Philosophy in Electrical and Computer Engineering, May 2011, 227 Pages.
"International Preliminary Report on Patentability Issued in PCT Application No. PCT/US2014/043299", dated Aug. 19, 2015, 11 Pages.
"International Search Report & Written Opinion Issued in PCT Patent Application No. PCT/US2014/043299", dated Nov. 12, 2014, 12 Pages.

(56) References Cited

OTHER PUBLICATIONS

Weikum, et al., "Multi-Level Recovery", In Proceedings of the Ninth ACM SIGACT-SIGMOD-SIGART Symposium on Principles of Database Systems, Apr. 2, 1990, pp. 109-123.

"International Search Report and Written Opinion Issued in PCT Application No. PCT/US2015/054350", dated Feb. 5, 2016, 9 Pages.

Pollett, Chris, "Checkpointing, Redo, Undo/Redo Logging", Retrieved from <<http://www.cs.sjsu.edu/faculty/pollett/157b.12.05s/Lec20042005.pdf>>, Apr. 20, 2005, 10 Pages.

Prohaska, Rich, "Fast Updates with TokuDB", Retrieved from <<https://www.percona.com/blog/2013/02/12/fast-updates-with-tokudb/>>, Feb. 12, 2013, 2 Pages.

Pugh, William, "Skip Lists: A Probabilistic Alternative to Balanced Trees", In Magazine Communications of the ACM, vol. 33, Issue 6, Jun. 1990, 8 Pages.

Rashid, Layali, "Exploiting Multithreaded Architectures to Improve Data Management Operations", A Thesis Submitted to the Faculty of Graduate Studies in Partial Fulfillment of the Requirements for the Degree of Master of Science, Sep. 2007, 117 Pages.

Rastogi, et al., "Versioning Algorithms for Improving Transaction Predictability in Real-time Main-Memory Databases", In Real-Time Systems, vol. 19, Issue 3, Retrieved Date: Sep. 10, 2014, 18 Pages.

Reed, David Patrick, "Naming and Synchronization in a Decentralized Computer System", In Thesis of Massachusetts Institute of Technology. Dept. of Electrical Engineering and Computer Science, Sep. 1978, 187 Pages.

Roh, et al., "B+-tree Index Optimization by Exploiting Internal Parallelism of Flash-based Solid State Drives", In Proceedings of the VLDB Endowment, vol. 5, Issue 4, Aug. 27, 2012, pp. 286-297.

Rosenblum, et al., "The Design and Implementation of a Log-Structured File System", In Journal of ACM Transactions on Computer Systems, vol. 10, Issue 1, Feb. 1, 1992, pp. 26-52.

Barga, et al., "Improving Logging and Recovery Performance in Phoenix/App", In Proceedings of the 20th International Conference on Data Engineering, Mar. 30, 2004, 12 Pages.

Barga, et al., "Recovery Guarantees for General Multi-Tier Applications", In Proceedings of the 18th International Conference on Data Engineering, Mar. 2002, 12 Pages.

Barga, et al., "Recovery Guarantees for Internet Applications", In Journal ACM Transactions on Internet Technology, vol. 4, Issue 3, Aug. 2004, 42 Pages.

Batory, et al., "GENESIS: An Extensible Database Management System", In Proceedings of IEEE Transactions on Software Engineering, vol. 14, Issue 11, Nov. 1988, pp. 1711-1730.

Bayer, et al., "Organization and Maintenance of Large Ordered Indexes", In Acta Informatica, vol. 1, Feb. 1972, pp. 245-262.

Bayer, et al., "Prefix B—Trees", In Journal ACM Transactions on Database Systems, vol. 2, Issue 1, Mar. 1977, pp. 11-26.

Berenson, et al., "A Critique of ANSI SQL Isolation Levels", In Proceedings of the ACM SIGMOD International Conference on Management of Data, Jun. 1995, 10 Pages.

Bernstein, et al., "Hyder—A Transactional Record Manager or Shared Flash", In 5th Biennial Conference on Innovative Data Systems Research, Jan. 9, 2011, pp. 9-20.

Bernstein, et al., "Implementing Recoverable Requests Using Queues", In Proceedings of SIGMOD Conference on Management of Data, May 1, 1990, pp. 112-122.

Bernstein, et al., "Principles of Transaction Processing", In Book Principles of Transaction Processing, Morgan Kaufmann Publishers Inc., Jun. 9, 2009, 381 Pages.

Brantner, et al., "Building a Database on S3", In Proceedings of the ACM SIGMOD International Conference on Management of Data, Jun. 9, 2008, pp. 251-263.

Brewer, Dr. Eric A., "Towards Robust Distributed Systems", In Proceedings of the 19th Annual ACM Symposium on Principles of Distributed Computing, Jul. 16, 2000, 12 Pages.

Cahill, et al., "Serializable Isolation for Snapshot Databases", In Journal ACM Transactions on Database Systems, vol. 34, Issue 4, Jun. 9, 2008, pp. 729-738.

Callaghan, Mark, "Types of writes", Retrieved from <<http://smalldatum.blogspot.in/2014/04/types-of-writes.html>>, Apr. 16, 2014, 3 Pages.

Cha, et al., "Cache-Conscious Concurrency Control of Main-Memory Indexes on Shared-Memory Multiprocessor Systems", In Proceedings of the 27th International Conference on Very Large Data Bases, Sep. 11, 2001, 10 Pages.

Chang, et al., "Bigtable: A Distributed Storage System for Structured Data", In Proceedings of the Seventh Symposium on Operating System Design and Implementation, Nov. 2006, 14 Pages.

Chen, et al., "Fractal Prefetching B+ Trees: Optimizing Both Cache and Disk Performance", In Proceedings of the ACM SIGMOD International Conference on Management of Data, Jun. 4, 2002, 12 Pages.

Chow, et al., "Distributed Operating Systems and Algorithms", In Book Distributed Operating Systems and Algorithms, Addison-Wesley Longman Publishing Co., Inc., Mar. 1997, 54 Pages.

Comer, Douglas, "The Ubiquitous B-Tree", In Computing Surveys, vol. 11, Issue 2, Jun. 1979, pp. 121-137.

Cooper, et al., "PNUTS: Yahoo!'s Hosted Data Serving Platform", In Proceedings of the VLDB Endowment, vol. 1, Issue 2, Aug. 24, 2008, 12 Pages.

Das, et al., "ElasTraS: An Elastic Transactional Data Store in the Cloud", In Proceedings of the Conference on Hot Topics in Cloud Computing, Jun. 15, 2009, 5 Pages.

Das, et al., "G-Store: A Scalable Data Store for Transactional Multi-Key Access in the Cloud", Workshop on Cloud Computing in Conjunction with SIGMOD, Jun. 10, 2010, 12 Pages.

Debnath, et al., "FlashStore: High Throughput Persistent Key-Value Store", In Proceedings of the VLDB Endowment, vol. 3, Issue 2, Sep. 2010, pp. 1414-1425.

Debnath, et al., "SkimpyStash: RAM Space Skimpy Key-Value Store on Flash-Based Storage", In Proceedings of the ACM SIGMOD International Conference on Management of Data, Jun. 12, 2011, 12 Pages.

Decandia, et al., "Dynamo: Amazon's Highly Available Key-Value Store", In Proceedings of Twenty-First ACM SIGOPS Symposium on Operating Systems Principles, Oct. 14, 2007, pp. 205-220.

Delaney, Kalen, "Inside Microsoft SOL Server 2005: The Storage Engine", In Book Inside Microsoft SOL Server 2005: The Storage Engine, Published by Microsoft Cooperation, Retrieved Date: Nov. 9, 2009, 2 Pages.

Delaney, Kalen, "SQL Server In-Memory OLTP Internals Overview", In White Paper of SQL Server Technical Article, Mar. 2014, 50 Pages.

Diaconu, et al., "Hekaton: SQL Server's Memory-Optimized OLTP Engine", In Proceedings of ACM SIGMOD International Conference on Management of Data, Jun. 22, 2013, pp. 1243-1254.

Effelsberg, et al., "Principles of Database Buffer Management", In Journal ACM Transactions on Database Systems, vol. 9, Issue 4, Dec. 5, 1984, pp. 560-595.

Ewbank, Kay, "A Better B-Tree in Hekaton", Retrieved from <<http://www.i-programmer.info/news/84/5239.html>>, Dec. 24, 2012, 3 Pages.

Franklin, et al., "Crash Recovery in Client-Server EXODUS", In Proceedings of ACM-SIGMOD International Conference on Management of Data, Jun. 2, 1992, 10 Pages.

Gilbert, et al., "Brewer's Conjecture and the Feasibility of Consistent, Available, Partition-Tolerant Web Services", In Newsletter of the ACM SIGACT News, vol. 33, Issue 2, Jun. 2002, 12 Pages.

Graefe, et al., "Transaction Support for Indexed Summary Views", In Proceedings of the ACM SIGMOD International Conference on Management of Data, Jun. 13, 2004, pp. 323-334.

Graefe, Goetz, "Write-Optimized B-Trees", In Proceedings of the Thirtieth International Conference on very Large Data Bases, vol. 30, Aug. 31, 2004, pp. 672-683.

Gray, et al., "The Recovery Manager of the System R Database Manager", In Journal ACM Computing Surveys, vol. 13, Issue 2, Jun. 1981, pp. 223-242.

(56) References Cited

OTHER PUBLICATIONS

Greenwood, et al., "Reference Architecture v3.0", Retrieved from <<http://www.aosd-europe.net/deliverables/d103.pdf>>, Jan. 8, 2008, 49 pages.
Haas, et al., "Starburst Mid-Flight: As the Dust Clears", In Proceedings of IEEE Transactions on Knowledge and Data Engineering, vol. 2, Issue 1, Mar. 1990, pp. 143-160.
Hamilton, James, "Perspectives", Retrieved from <<http://perspectives.mvdirona.com/2008/07/google-megastore/>>, Jul. 10, 2008, 5 Pages.
Harizopoulos, et al., "A Case for Staged Database Systems", In Proceedings of Conference on Innovative Data Systems Research (CIDR), Jan. 2003, 12 Pages.
Harizopoulos, et al., "OLTP Through the Looking Glass, and What We Found There", In Proceedings of the ACM SIGMOD International Conference on Management of Data, Jun. 9, 2008, 12 Pages.
Hellerstein, et al., "Architecture of a Database System", Foundations and Trends in Databases, vol. 1, Issue 2, 2007, pp. 141-259.
Herlihy, et al., "Linearizability: a Correctness Criterion for Concurrent Objects", In Journal ACM Transactions on Programming Languages and Systems, vol. 12, Issue 3, Jul. 1990, pp. 463-492.
Holloway, Allison L., "Adapting Database Storage for New Hardware", In Doctoral Dissertation Adapting Database Storage for New Hardware, 2009, 146 Pages.
Hu, et al., "Write Amplification Analysis in Flash-Based Solid State Drives", In Proceedings of SYSTOR: The Israeli Experimental Systems Conference, Article No. 10, May 4, 2009, 9 Pages.
Jhingran, et al., "Analysis of Recovery in a Database System Using a Write-Ahead Log Protocol", In Proceedings of the ACM SIGMOD International Conference on Management of Data, Jun. 2, 1992, pp. 175-184.
Johnson, et al., "Scalability of Write-Ahead Logging on Multicore and Multisocket Hardware", In Proceedings of the VLDB Endowment, Dec. 3, 2011, 25 Pages.
Jones, et al., "The Atomic Manifesto: a Story in Four Quark", In Newsletter ACM SIGOPS Operating Systems Review, vol. 39, Issue 2, Apr. 2005, pp. 41-46.
Kashyap, Aditya, "File System Extensibility and Reliability Using an in-Kernel Database", A Thesis Submitted to the Graduate School in Partial Fulfillment of the Requirements for the Degree of Master of Science in Computer Science, Technical Report FSL-04-06, Dec. 2004, 24 Pages.
Kissinger, et al., "KISS-Tree: Smart Latch-Free In-Memory Indexing on Modern Architectures", In Proceedings of the Eighth International Workshop on Data Management on New Hardware, May 21, 2012, 8 Pages.
Kissinger, et al., "QPPT: Query Processing on Prefix Trees", In Proceedings of 6th Biennial Conference on Innovative Data Systems Research, Jan. 6, 2013, 11 Pages.
"Amazon DynamoDB", Retrieved from <<https://web.archive.org/web/20130116055645/https://aws.amazon.com/dynamodb/>>, Retrieved Date: Feb. 21, 2013, 1 Page.
"Amazon SimpleDB", Retrieved from <<https://web.archive.org/web/20100928224754/http://aws.amazon.com/simpledb/>>, Retrieved Date: Sep. 23, 2010, 7 Pages.
"Building the Customer-Centric Systems Architecture", Retrieved from <<http://mike2.openmethodology.org/wiki/Building_the_Customer-Centric_Systems_Architecture>>, Retrieved Date: Nov. 17, 2008, 3 Pages.
"Bulletin on Data Engineering", In Proceedings of IEEE Computer Society Technical Committee, vol. 8, Issue 2, Jun. 1985, 122 Pages.
"Eventually Consistent", Published in ACM Queue, vol. 6, Issue 6, Oct. 16, 2008, 6 Pages.
"Hbase", Retrieved from <<https://web.archive.org/web/20100817105611/http://hbase.apache.org/>>, Aug. 13, 2010, 3 Pages.
"MemSQL Architecture—The Fast (MVCC, InMem, LockFree, CodeGen) and Familiar (SQL)", Retrieved from <<http://highscalability.com/blog/2012/8/14/memsql-architecture-the-fast-mvcc-inmem-lockfree-codegen-and.html>>, Aug. 14, 2012, 14 Pages.
"MemSQL Indexes", Retrieved from <<https://web.archive.org/web/20130311105619/http://developers.memsql.com/docs/1b/indexes.html>>, Retrieved Date: Feb. 21, 2013, 1 Page.
"Merge Operator", Retrieved from <<https://github.com/facebook/rocksdb/wiki/Merge-Operator>>, Retrieved Date: Jun. 4, 2014, 10 Pages.
"Microsoft Common Log File System", Retrieved from <<https://msdn.microsoft.com/en-us/library/bb986747(VS.85).aspx>>, Retrieved Date: Sep. 23, 2010, 2 Pages.
"Microsoft Windows Azure", Retrieved from <<https://web.archive.org/web/20100923184938/http://www.microsoft.com/windowsazure/windowsazure>>, Retrieved Date: Sep. 23, 2010, 3 Pages.
"MongoDB", Retrieved from <<https://web.archive.org/web/20130216020324/http://www.mongodb.org/>>, Retrieved Date: Feb. 21, 2013, 2 Pages.
"NoSQL", Retrieved from <<https://en.wikipedia.org/wiki/NoSQL>>, Sep. 18, 2013, 8 Pages.
"OpenVMS Record Management Services Reference Manual", Retrieved from <<https://web.archive.org/web/20050226025509/http://www.itec.suny.edu/scsys/vms/vmsdoc/72final/4523/4523pro.html>>, Jan. 1999, 9 Pages.
"Project Voldemort", Retrieved from <<http://www.project-voldemort.com/voldemort/>>, Retrieved Date: Feb. 21, 2013, 1 Page.
"Redo Processing", Retrieved from <<http://www.datadisk.co.uk/html_docs/oracle_dg/redo.htm>>, Retrieved Date: Oct. 7, 2011, 5 Pages.
"TPC-W Benchmarks", Retrieved from <<http://www.tpc.org/tpcw/>>, Retrieved Date: Sep. 23, 2010, 2 Pages.
"Wkipedia: (CRUD)", Retrieved from <<https://en.wikipedia.org/wiki/Create,_read,_update_and_delete>>, Retrieved Date: Feb. 22, 2013, 2 Pages.
"Xbox LIVE", Retrieved from <<https://web.archive.org/web/20130304085055/http://www.xbox.com/en-in/Live>>, Retrieved Date: Feb. 22, 2013, 3 Pages.
"Non Final Office Action Issued in U.S. Appl. No. 12/362,481", dated Jul. 22, 2011, 11 Pages.
"Notice of Allowance Issued in U.S. Appl. No. 12/362,481", dated Dec. 29, 2011, 12 Pages.
"Response Filed in U.S. Appl. No. 12/362,481", filed Oct. 26, 2011, 15 Pages.
"Final Office Action Issued in U.S. Appl. No. 12/827,941", dated Mar. 21, 2013, 11 Pages.
"Non Final Office Action Issued in U.S. Appl. No. 12/827,941", dated Jan. 17, 2014, 5 Pages.
"Non Final Office Action Issued in U.S. Appl. No. 12/827,941", dated Jun. 7, 2012, 9 Pages.
"Notice of Allowance Issued in U.S. Appl. No. 12/827,941", dated Jan. 31, 2014, 17 Pages.
"Response Filed in U.S. Appl. No. 12/827,941", Filed Date: Oct. 8, 2012, 11 Pages.
"Response Filed in U.S. Appl. No. 12/827,941", Filed Date: Jul. 22, 2013, 13 Pages.
"Amendment Filed in U.S. Appl. No. 12/986,962", Filed Date: Apr. 30, 2013, 13 Pages.
"Amendment Filed in U.S. Appl. No. 12/986,962", Filed Date: Nov. 22, 2013, 13 Pages.
"Amendment Filed in U.S. Appl. No. 12/986,962", Filed Date: Mar. 17, 2014, 13 Pages.
"Final Office Action Issued in U.S. Appl. No. 12/986,962", dated Aug. 22, 2013, 39 Pages.
"Non Final Office Action Issued in U.S. Appl. No. 12/986,962", dated Jan. 30, 2013, 35 Pages.
"Non Final Office Action Issued in U.S. Appl. No. 12/986,962", dated Dec. 16, 2013, 41 Pages.
"Notice of Allowance Issued in U.S. Appl. No. 12/986,962", dated Jul. 8, 2014, 14 Pages.
Zaitsev, Peter, "MVCC: Transaction IDs, Log Sequence Numbers and Snapshots", Retrieved from <<https://www.percona.com/blog/2007/12/19/mvcc-transaction-ids-log-sequence-numbers-and-snapshots/>>, Dec. 19, 2007, 6 Pages.
"Amendment and Response Filed in U.S. Appl. No. 13/527,880", Filed Date: Aug. 14, 2014, 23 Pages.

(56) References Cited

OTHER PUBLICATIONS

"Non Final Office Action Issued in U.S. Appl. No. 13/527,880", dated Mar. 14, 2014, 32 Pages.

"Final Office Action Issued in U.S. Appl. No. 13/924,567", dated Dec. 17, 2015, 23 Pages.

"Non Final Office Action Issued in U.S. Appl. No. 13/924,567", dated Jun. 5, 2015, 19 Pages.

"Notice of Allowance Issued in U.S. Appl. No. 13/924,567", dated Jul. 13, 2016, 9 Pages.

"Notice of Allowance Issued in U.S. Appl. No. 13/924,567", dated Nov. 14, 2016, 5 Pages.

Wu, et al., "An Efficient B-tree Layer Implementation for Flash-Memory Storage Systems", In Journal ACM Transactions on Embedded Computing Systems, vol. 6, Issue 3, Jul. 2007, 23 Pages.

Agrawal, et al., "Integrated Concurrency Control and Recovery Mechanisms: Design and Performance Evaluation", In Journal ACM Transactions on Database Systems, vol. 10 Issue 4, Dec. 1, 1985, pp. 529-564.

Agrawal, et al., "The Performance of Concurrency Control and Recovery Algorithms for Transaction-Oriented Database Systems", In Proceedings of IEEE Database Eng. Bull., vol. 8, Issue 2, Jun. 1985, pp. 58-67.

Aguilera, et al., "Sinfonia: A New Paradigm for Building Scalable Distributed Systems", In Journal ACM Transactions on Computer Systems, vol. 27 Issue 3, Oct. 14, 2007, 16 Pages.

Ailamaki, et al., "DBMSs on a Modern Processor: Where Does Time Go?", In Proceedings of the 25th International Conference on Very Large Data Bases, Sep. 7, 1999, pp. 266-277.

Astrahan, et al., "System R: Relational Approach to Database Management", In Journal ACM Transactions on Database Systems, vol. 1, Issue 2, Jun. 1, 1976, pp. 97-137.

Athanassoulis, et al., "MaSM: Efficient Online Updates in Data Warehouses", In Proceedings of the International Conference on Management of Data, Jun. 12, 2011, 12 Pages.

Badarla, Venkata Ramana, "Concurrency Control Techniques", Retrieved from <<http://home.iitj.ac.in/~ramana/ch12-concurrency-control.pdf>>, Retrieved Date: Sep. 10, 2014, 44 Pages.

"Office Action and Search Report Issued in Russian Patent Application No. 2015154744", dated Jun. 13, 2018, 7 Pages. (W/o English Translation).

"Office Action Issued in Chinese Patent Application No. 201480035652.7", dated Apr. 10, 2018, 13 Pages.

"Office Action Issued in Japanese Patent Application No. 2016-521827", dated May 7, 2018, 6 Pages.

"Second Office Action Issued in Chinese Patent Application No. 201480035652.7", dated Nov. 26, 2018, 7 pages.

\* cited by examiner

LOG-STRUCTURED STORAGE FOR DATA ACCESS

CROSS-REFERENCE TO RELATED APPLICATION

This application is a continuation of, and claims benefit from, commonly assigned, co-pending U.S. patent application Ser. No. 13/924,567, with inventors David B. Lomet et al., filed Jun. 22, 2013, entitled "Latch-Free, Log-Structured Storage for Multiple Access Methods," which is hereby incorporated by reference herein in its entirety.

BACKGROUND

Users of electronic devices frequently need to access database systems to obtain various types of information. Many different techniques have been devised for storage and retrieval of data items. For example, some recent hardware platforms have exploited recent hardware developments such as multi-core processors, multi-tiered memory hierarchies, and secondary storage devices such as flash, in an effort to provide higher performance. This has increased potential system performance, but it has been difficult for systems to make effective use of newly developed platform aspects, as well as conventional platform aspects.

SUMMARY

According to one general aspect, a system may include a device that includes at least one processor, the device including a data manager comprising instructions tangibly embodied on a computer readable storage medium for execution by the at least one processor. The data manager may include a data opaque interface configured to provide, to an arbitrarily selected page-oriented access method, interface access to page data storage that includes latch-free access to the page data storage.

According to another aspect, a system may include a device that includes at least one processor, the device including a data manager comprising instructions tangibly embodied on a computer readable storage medium for execution by the at least one processor. The data manager may include a page manager configured to flush a page state to secondary storage based on installing a pointer to a flush delta record in a mapping table, via a compare and swap (CAS) operation, the flush delta record prepended to an existing page state that is replaced in the mapping table via the CAS operation.

According to another aspect, a system may include a device that includes at least one processor, the device including a data manager comprising instructions tangibly embodied on a computer readable storage medium for execution by the at least one processor. The data manager may include a page manager configured to initiate a flush operation of a first page in cache layer storage to a location in secondary storage, based on initiating a copy of a page state of the first page into a secondary storage buffer, initiating a prepending of a flush delta record to the page state, the flush delta record including a secondary storage address indicating a storage location of the first page in secondary storage and an annotation associated with a caller, and initiating an update to the page state based on installing an address of the flush delta record in a mapping table, via a compare and swap (CAS) operation.

According to another aspect, a system may include a device that includes at least one processor, the device including a data manager comprising instructions tangibly embodied on a computer readable storage medium for execution by the at least one processor. The data manager may include a buffer manager configured to control updates to a log-structured secondary storage buffer via latch-free update operations.

According to another aspect, a system may include a device that includes at least one processor, the device including a data manager comprising instructions tangibly embodied on a computer readable storage medium for execution by the at least one processor. The data manager may include a page manager configured to initiate a swap operation of a portion of a first page in cache layer storage to a location in secondary storage, based on initiating a prepending of a partial swap delta record to a page state associated with the first page, the partial swap delta record including a main memory address indicating a storage location of a flush delta record that indicates a location in secondary storage of a missing part of the first page.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

I. Introduction

Figure 1:
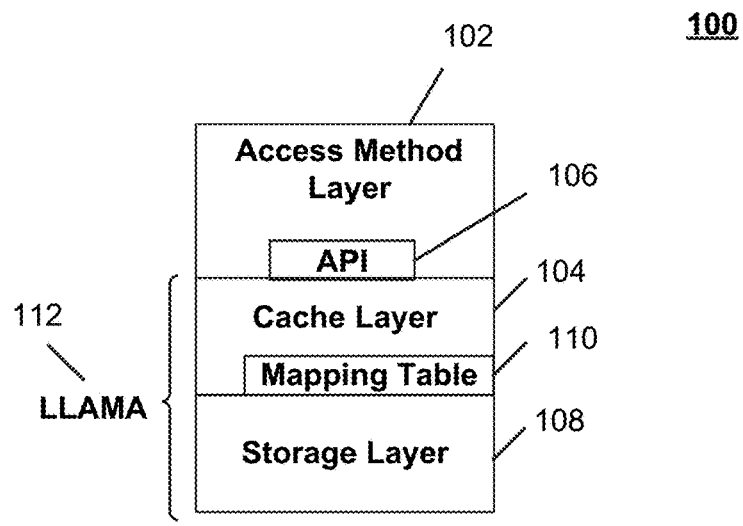
FIG. 1 illustrates an example architectural layering for access methods for cache/storage layers.

Recent developments in hardware platforms have exploited multi-core processors, multi-tiered memory hierarchies, and secondary storage devices such as flash, in an effort to provide higher performance. For example, central processing unit (CPU) changes have included multi-core processors and main memory access that involves multiple levels of caching. For example, flash storage, and hard disk vendor recognition that update-in-place compromises capacity, has led to increased use of log structuring. For example, cloud data centers increase system scale, and the use of commodity hardware puts increased emphasis on high availability techniques.

However, while potential system performance may increase, it may be difficult for systems to make effective use of these recent platform aspects. For example, data centric systems supporting multiple users accessing large amounts of data may exploit a software architecture designed for hardware as it existed many years in the past (e.g., they may target uniprocessors, working on a single level memory (little processor caching, and with only modest latency to main memory), and accessing magnetic disks).

Efforts to change the approach have improved the environment, but continue to miss out on substantial potential performance gains. For example, there have been efforts to avoid latches, which cause blocking when accesses to data conflict; however, these efforts may have involved partitioning so that threads avoid such conflicts, which may introduce substantial overheads. For example, updating data in place may have a negative impact on memory performance, which may lead to the consideration of cache line alignment and using local trees instead of binary search over vectors. However, there has continued to be a disadvantageous amount of update in place, which adversely impacts processor caching performance, e.g., via cache invalidations. Further, implementations have begun exploiting flash for its higher accesses/second and reduced access latency. However, random updates may be comparatively expensive, even with the use of a flash translation layer.

J. Levandoski et al., "Deuteronomy: Transaction Support for Cloud Data," *Conference on Innovative Data Systems Research* (CIDR) (January 2011), pp. 123-133 and D. Lomet et al., "Unbundling Transaction Services in the Cloud," *Conference on Innovative Data Systems Research* (CIDR), 2009, discuss example techniques for providing consistency (i.e., transactions) in a cloud setting. Example techniques discussed herein may focus on an example DEUTERONOMY data component (DC) and on maximizing its performance on current hardware. For example, a DC may manage storage and retrieval of data accessed via CRUD (create, read, update, delete) atomic operations. For example, a DC may be non-distributed, instead using a local mechanism that can be amalgamated into a distributed system via software layers on top of it (e.g., a DEUTERONOMY transactional component (TC) and/or a query engine).

As discussed further herein, there appear to be issues posed by current hardware that may impact access methods (e.g., B-trees, hashing, multi-attribute, temporal, etc). Further, as discussed herein, these issues may be resolved with example general mechanisms applicable to most (e.g., arbitrarily selected) access methods.

For example, in accordance with example techniques discussed herein, latch-free techniques may be utilized to achieve advantageous processor utilization and scaling with multi-core processors. For example, as discussed herein, delta updating that reduces cache invalidations may be utilized to achieve advantageous performance with multi-level cache based memory systems. For example, write limited storage, with its limited performance of random writes and flash write limits, may be overcome via log structuring.

For example, the BW-TREE (see, e.g., J. Levandoski, et al., "The Bw-Tree: A B-tree for New Hardware Platforms," *29th IEEE International Conference on Data Engineering* (ICDE 2013), Apr. 8-11, 2013), an index somewhat similar to B-trees (see, e.g., R. Bayer et al. "Organization and Maintenance of Large Ordered Indices," *Acta Informatica*, Vol. 1, Issue 3, 1972, pp. 173-189, and D. Comer, "The Ubiquitous B-tree," *ACM Computing Surveys* (CSUR), Vol. 11, Issue 2, June 1979, pp. 121-137), is an example of a DC or key-value store that may exploit these example techniques. An example BW-TREE may involve a paradigm for techniques for achieving latch-freedom and log structuring more generally. In accordance with example techniques discussed herein, latch-free and log-structure techniques may be implemented in a cache/storage subsystem capable of supporting multiple access methods, somewhat analogously as a conventional cache/storage subsystem may handle latched access to fixed size pages that are written back to disks as in-place updates.

In accordance with example techniques discussed herein, an example system that may be referred to herein as LLAMA (Latch-free, Log-structured Access Method Aware), includes a caching and storage subsystem for (at least) recently developed hardware environments (e.g., flash, multi-core), although one skilled in the art of data processing will understand that such example techniques are not limited only to recently developed hardware.

For example, LLAMA may support an application programming interface (API) for arbitrarily selected page-oriented access methods that provides both cache and storage management, optimizing processor caches and secondary storage. For example, caching (CL) and storage (SL) layers may use a common mapping table that separates a page's logical and physical location. For example, the cache layer (CL) may support data updates and management updates (e.g., for index re-organization) via latch-free compare-and-swap atomic state changes on its mapping table.

For example, the storage layer (SL) may use the same mapping table to handle the page location changes produced by log structuring on every page flush. For example, a latch-free BW-TREE implementation (e.g., an implementation using a BW-TREE, as an example of an ordered B-tree style index) may be used. In this context, a "flush" operation may refer to transferring a page from main memory (e.g., cache storage) to secondary storage by way of copying the page to an output buffer.

Example techniques discussed herein may provide mapping tables that may virtualize both the location and the size of pages. For example, such virtualization may be utilized for both main memory designs and stable storage designs (e.g., log structured storage designs), as discussed further herein.

In this context, a "page" may refer to an object in storage, which may be accessed via a physical storage address. As used herein, a "page" may be associated with a flexible size, and may represent a page unit of storage that may be distributed over multiple discontiguously stored segments of storage. The storage may include volatile and/or stable storage.

Example techniques discussed herein may separate an access method layer from cache/storage management. As an example, techniques discussed herein may be used to enforce a write-ahead log protocol. For example, before flushing a page, a conventional database kernel may check a page log sequence number (LSN) to determine whether there are updates that are not yet stable in the transactional log. For example, LLAMA cache management may exploit example delta updates to "swap out" a partial page. For example, it can drop from the cache the part of the page already present on secondary storage (which does not include recent delta updates). For example, the access method layer will be regularly flushing for transactional log checkpointing. Thus, the cache manager will find sufficient candidate (possibly partial) pages to satisfy any buffer size constraint.

Example techniques discussed herein may provide a framework that enables a substantial number of access methods (i.e., not just a single instance) to exploit these techniques by implementing a subsystem layer that provides them. Further, a log structured store may be implemented for writing data to secondary storage that provides advantageous efficiency. Hence, an access method may focus on the main memory aspects of its index, and example techniques discussed herein may provide the framework for achieving performance metrics similar to performance metrics of the BW-TREE.

For example, a technique such as LLAMA, through its API, may provide latch-free page updating, which is accomplished in main memory via a compare and swap (CAS) atomic operation on the mapping table.

For example, in managing the cache, a technique such as LLAMA may reclaim main memory by dropping only previously flushed portions of pages from memory, thus not involving any input/output (I/O) operations, even when swapping out "dirty" pages. Thus, a technique such as LLAMA may be able to control its buffer cache memory size without input from its access method user.

For example, for effective management of secondary storage, a technique such as LLAMA may utilize log-structuring. For example, a technique such as LLAMA may improve performance compared with conventional log structuring by using partial page flushes and pages with substantially no empty space—i.e., substantially 100% storage utilization. These may reduce the number of input/output operations (I/Os) and amount of storage consumed per page when a page is flushed, and hence may reduce the write amplification that may be experienced when log-structuring is used. Further, all storage related operations may be completely latch-free.

For example, a technique such as LLAMA may provide (at least) a limited form of system transaction. In this sense, system transactions are not user level transactions, but rather, exploiting the log-structured store, provide atomicity purely for the "private use" of the access method (e.g., for index structure modifications (SMOs)). For example, this may enable indexes to adapt as they grow while concurrent updating continues.

For example, the BW-TREE structure may include a type of latch-free B-tree structure. For example, updates to BW-TREE nodes may be performed based on prepending update deltas to a prior page state. Thus, the BW-TREE may be latch-free, as it may allow concurrent access to pages by multiple threads. Because such delta updating preserves the prior state of a page, it may provide improved processor cache performance as well.

Example techniques using BW-TREEs may further provide page splitting techniques that are also latch-free, and that may employ B-link tree style side pointers. Splits (and other structure modification operations) may be atomic both within main memory and when made stable. For example, atomic record stores may be implemented based on a BW-TREE architecture.

One skilled in the art of data processing will appreciate that there may be many ways to accomplish the latch-free and log-structured storage discussed herein, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

FIG. 1 illustrates an example architectural layering for access methods for cache/storage layers. An access method layer 102 is the top layer, as shown in FIG. 1. The access method layer 102 interacts with a Cache Layer 104, which is the middle layer. An application programming interface (API) 106 may be used for activities between the access method layer 102 and the Cache Layer 104. An example storage layer 108 may interact with a mapping table 110, which may be shared between the cache layer 104 and the storage layer 108. For example, LLAMA 112 includes the cache layer 104 and the storage layer 108. For example, a storage layer may support a log structured flash store. In accordance with example techniques discussed herein, a log structured store may manage both flash and disk storage. This design may be architecturally compatible with existing database kernels, while also being suitable as a standalone or DEUTERONOMY style atomic record stores (ARS).

Figure 2:
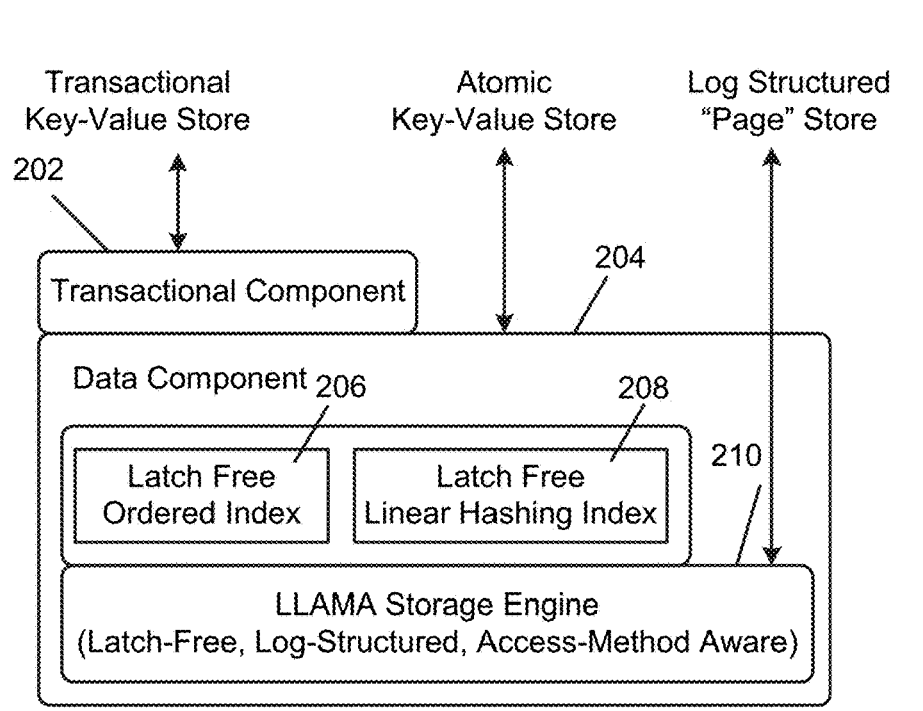
FIG. 2 is a block diagram of an example architecture for latch-free, log-structured storage for multiple access methods.

For example, a technique such as LLAMA may support a page abstraction, supporting access method implementations for cache/storage layers. Further, a transactional component (e.g., a DEUTERONOMY-style transactional component) may be added on top. FIG. 2 is a block diagram of an example architecture for latch-free, log-structured storage for multiple access methods. As shown in FIG. 2, a transactional component 202 may support a transactional key-value store, and may operate with a data component 204 that may include an atomic key-value store. As shown in FIG. 2, the data component 204 may include a latch-free ordered index 206 and/or a latch free linear hashing index 208. As shown in FIG. 2, the data component 204 may further include an example latch-free, log-structured, access-method aware (LLAMA) storage engine 210 (e.g., LLAMA 112 of FIG. 1).

The example API 106 may be "data opaque," meaning that the example LLAMA implementation does not "see" (e.g., does not examine, or analyze, or depend on) what the access method (e.g., of the access method layer 102) is putting into pages or delta records, and acts independently of what is provided in the pages or delta records by the access method. Thus, example LLAMA implementations as discussed herein may act in response to specific operations that are not dependent on what is provided by the access method, as discussed above.

Figure 3:
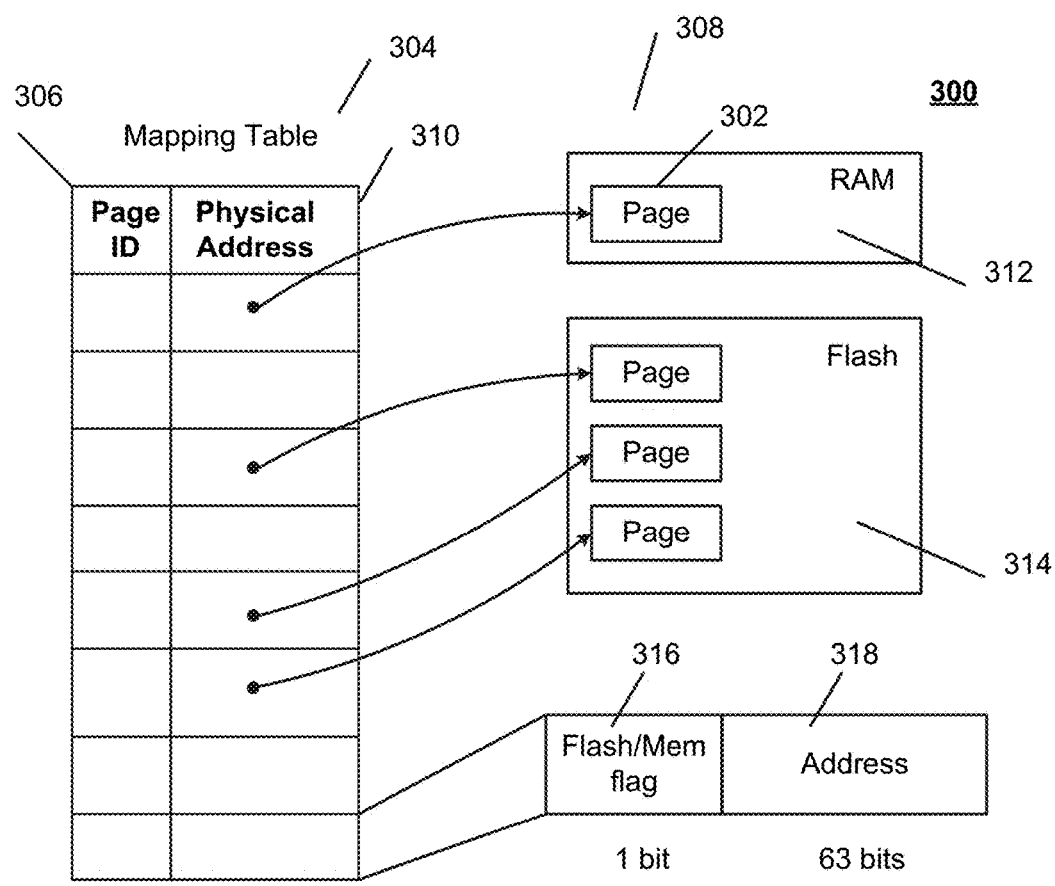
FIG. 3 illustrates an example mapping table.

As shown in FIG. 3, a page 302 may be accessed via a mapping table 304 that maps page identifiers (PIDs) 306 to states 308 (e.g., via a "physical address" 310 stored in the mapping table 304), either in main memory cache 312 or on secondary storage 314. For example, the main memory cache 312 may include random access memory (RAM). For example, the secondary storage 314 may include flash memory. For example, pages 302 may be read from secondary storage 314 into a main memory cache 312 on demand, they can be flushed to secondary storage 314, and they may be updated to change page state while in the cache 312. For example, substantially all page state changes (both data state and management state) may be provided as atomic operations, in accordance with example techniques discussed herein. As shown in FIG. 3, an example physical address 310 may include a flash/memory flag 316 (e.g., for 1 bit, as shown in the example) indicating whether the physical address is associated with flash or memory (e.g., cache) storage, with an address field 318 for (at least) the address itself (e.g., for 63 bits, as shown in the example). One skilled in the art of data processing will appreciate that there are many ways of representing a "physical address" (e.g., other than a 64-bit representation), without departing from the spirit of the discussion herein.

In accordance with example techniques discussed herein, LLAMA, through its API, may provide latch-free page updating via a compare and swap (CAS) atomic operation on the mapping table 304 (e.g., in lieu of a conventional latch that guards a page from concurrent access by blocking threads). For example, the CAS strategy may advantageously increase processor utilization and improve multi-core scaling.

In accordance with example techniques discussed herein, in managing the cache, LLAMA may reclaim main memory by dropping only previously flushed portions of pages from memory, thus not using any I/O, even when swapping out "dirty" pages. Thus, an example architecture such as LLAMA may control its buffer cache memory size without a need to examine data stored in pages by its access method user (e.g., as an example architecture such as LLAMA is unaware of transactions and write-ahead logging).

An example architecture such as LLAMA may use log-structuring to manage secondary storage (e.g., providing the advantages of avoiding random writes, reducing the number of writes via large multi-page buffers, and wear leveling involved with flash memory). Further, an example architecture such as LLAMA may advantageously improve performance (e.g., as compared with conventional log structuring) with partial page flushes and pages with substantially no empty space—i.e., substantially 100% utilization. For example, these may reduce the number of I/Os and storage consumed per page when a page is flushed, and hence may reduce the write amplification that may otherwise be encountered when log-structuring is used. Further, substantially all storage related operations may be completely latch-free.

Additionally, an example architecture such as LLAMA may support (at least) a limited form of system transaction (see, e.g., D. Lomet et al., "Unbundling Transaction Services in the Cloud," *Conference on Innovative Data Systems Research* (CIDR), 2009, with regard to system transactions). For example, system transactions may not be user transactions, but rather may provide atomicity purely for the "private use" of the access method (e.g., for index structure modifications (SMOs)—see, e.g., C. Mohan et al., "ARIES/IM: An Efficient and High Concurrency Index Management Method Using Write-Ahead Logging," In *Proceedings of the 1992 ACM SIGMOD International Conference on Management of Data* (SIGMOD '92), 1992, pp. 371-380). For example, a property that system transactions recorded separately from the transaction log may be effective is an example of an advantageous insight of the DEUTERONOMY approach to decomposing a database kernel.

The discussion below includes further descriptions of example operation interfaces that an access method implementer may encounter when using an example architecture such as LLAMA, with further discussion regarding how it may be used. The discussion below includes further descriptions of example cache layers, in accordance with example techniques discussed herein, as well as example designs of the log structured storage layer. Further, discussion is provided with regard to example system transaction mechanisms and example measures that may be taken to provide atomicity, in accordance with example techniques discussed herein. Further, discussion is provided with regard to example log structured storage recovery from system crashes, in accordance with example techniques discussed herein.

In designing an example system such as LLAMA, a design goal may include a goal to be as "general purpose" as possible, which may sometimes lead to a goal to "be as low level" as possible. However, for an example system such as LLAMA to be "general purpose," it may be desirable to operate effectively while knowing as little as possible about what an access method does in using its facilities. Thus, operations of an example system such as LLAMA may be "primitive," targeted at cache management and the updating of pages. For example, an example system such as LLAMA may include some additional facilities to support a primitive transaction mechanism that may be advantageously included for SMOs (e.g., page splits and merges).

In accordance with example techniques discussed herein, an example system such as LLAMA may include nothing in the interface regarding log sequence numbers (LSNs), write-ahead logging or checkpoints for transaction logs. In accordance with example techniques discussed herein, an example system such as LLAMA may include no idempotence test for user operations. Further, in accordance with example techniques discussed herein, an example system such as LLAMA may include no transactional recovery (e.g., which may be handled by an access method using an example system such as LLAMA, in accordance with example techniques discussed herein).

In accordance with example techniques discussed herein, an example access method may change state in response to user operations. For example, a user may want to create (C), read (R), update (U), or delete (D) a record (e.g., CRUD operations). In accordance with example techniques discussed herein, an example system such as LLAMA may not directly support these operations. Rather, the example access method may implement them as updates to the states of LLAMA pages.

For example, there may also be structure changes that are part of example access method operations. For example, a BW-TREE page split may involve posting a split delta to an original page O so that searchers know that a new page now contains data for a sub range of the keys in O. For example, these too may be handled as updates to a LLAMA page O.

In accordance with example techniques discussed herein, an example system such as LLAMA may support two forms of update, e.g., a delta update, and a replacement update. For example, an access method may choose to exploit these forms of updates in accordance with a user's wishes. For example, a BW-TREE may make a series of delta updates and at some point decide to "consolidate" and optimize the page by applying the delta updates to a base page. For example, the BW-TREE may then use a replacement update to generate the new base page.

In accordance with example techniques discussed herein, an example system such as LLAMA may retain information regarding the physical location of a page in secondary storage, throughout update operations and replacement operations as discussed herein, so that the system 100 has the secondary storage page location information for re-reading the page should it be swapped out of the main memory cache and for garbage collection, as further discussed herein. Thus, the system 100 may remember previous page locations and stable page state information.

For example, a delta update may be indicated as Update-D(PID, in-ptr, out-ptr, data). For example, the delta update may prepend a delta describing a change to the prior state of the page. For example, for the BW-TREE, the "data" parameter to Update-D may include at least <lsn, key, data> where the lsn enables idempotence. For example, the "in-ptr" points to the prior state of the page, and the "out-ptr" points to the new state of the page.

For example, a replacement update may be indicated as Update-R(PID, in-ptr, out-ptr, data). For example, a replacement update may result in an entirely new state for the page. The prior state, preserved when using an Update-D, may be replaced by the "data" parameter. Thus, the "data" parameter contains the entire state of the page with deltas "folded in."

For example, a "read" may be indicated as Read(PID, out-ptr). For example, a read may return, via "out-ptr," the address in main memory for the page. If the page is not in main memory, then the mapping table entry may contain a secondary storage address. For example, in that case, the page may be read into main memory and the mapping table may be updated with the new main memory address.

In addition to supporting data operations, example systems discussed herein (e.g., LLAMA) may provide operations to manage the existence, location, and persistence of pages. To adjust to the amount of data stored, the access method may add or subtract pages from its managed collections. To provide state persistence, an access method may from time to time flush pages to secondary storage. To manage this persistence, pages may be annotated appropriately (e.g., with log sequence numbers (lsns)). For example, a page manager may be configured to control flush operations, allocate operations, and free operations on pages.

For example, a flush operation may be indicated as Flush(PID, in-ptr, out-ptr, annotation). For example, a Flush may copy a page state into the log structured store (LSS) I/O buffer. Flush may be somewhat similar to Update-D in its impact on main memory, as it prepends a delta (with an annotation) to the prior state. This delta may be tagged as a "flush." In accordance with example techniques discussed herein, an example system such as LLAMA may store the LSS secondary storage address where the page is located (called the flash offset) and the caller "annotation" in the flush delta. For example, a Flush may not ensure a user that the I/O buffer is stable when it returns.

For example, a buffer manager may be configured to control updates to a log-structured secondary storage buffer via latch-free update operations. Thus, for example, multiple threads may simultaneously update the log-structured secondary storage buffer via latch-free operations.

For example, a "make stable" operation may be indicated as Mk-Stable(LSS address). For example, a Mk_Stable operation may ensure that pages flushed to the LSS buffer, up to the LSS address argument, are stable on secondary storage. When Mk_Stable returns, the LSS address provided and all lower LSS addresses are ensured to be stable on secondary storage.

For example, a "high-stable" operation may be indicated as Hi-Stable(out-LSS address). For example, a Hi_Stable operation may return the highest LSS address that is currently stable on secondary storage.

For example, a page manager may be configured to initiate a flush operation of a first page in cache layer storage to a location in secondary storage, based on initiating a copy of a page state of the first page into a secondary storage buffer, and initiating a prepending of a flush delta record to the page state, the flush delta record including a secondary storage address indicating a storage location of the first page in secondary storage and an annotation associated with a caller.

For example, a buffer manager may be configured to initiate a stability operation for determining that pages flushed to a secondary storage buffer, having lower addresses, up to a first secondary storage address argument, are stable in secondary storage.

For example, an "allocate" operation may be indicated as Allocate(out-PID). For example, an Allocate operation may return the PID of a new page allocated in the mapping table. All such pages may be remembered persistently, so Allocate may be included as part of a system transaction (as discussed further below), which may automatically flush its included operations.

For example, a "free" operation may be indicated as Free(PID). For example, a Free operation may make a mapping table entry identified by the PID available for reuse. In main memory, the PID may be placed on the pending free list for PIDs for a current epoch (as discussed further below). Again, because active pages may be remembered, Free may be included as a part of a system transaction.

In accordance with example techniques discussed herein, example LLAMA system transactions may be used to provide relative durability and atomicity (all or nothing) for structure modifications (e.g., SMOs). For example, an LSS and its page oriented records may be used as "log records." For example, all operations within a transaction may be automatically flushed to an in-memory LSS I/O buffer, in addition to changing page state in the cache. For example, each LSS entry may include the state of a page, for an example LSS that is strictly a "page" store.

In main memory, all such operations within a transaction may be held in isolation until transaction commit, as discussed further below. For example, at commit, all page changes in the transaction may be flushed atomically to the LSS buffer. For example, on abort, all changes may be discarded. For example, a system transaction manager may be configured to commit transactions and abort transactions.

For example, system transactions may be initiated and terminated via LLAMA supported operations.

For example, a "transaction begin" operation may be indicated as TBegin(out-TID). For example, a transaction identified by a transaction ID (TID) may be initiated. This may involve entering it into an active transaction table (ATT) maintained by the example LLAMA cache layer (CL) manager.

For example, a "transaction commit" operation may be indicated as TCommit(TID). For example, the transaction may be removed from the active transaction table and the transaction may be committed. For example, page state changes in the transaction may be installed in the mapping table and flushed to the LSS buffer.

For example, a "transaction abort" operation may be indicated as TAbort(TID). For example, the transaction may be removed from the active transaction table, changed pages may be reset to "transaction begin" in the cache, and no changes are flushed.

In accordance with example techniques discussed herein, in addition to Allocate and Free, Update-D operations may be permitted within a transaction to change page states. For example, Update-R might not be used, as it may complicate transaction undo, as discussed further below.

In accordance with example techniques discussed herein, transactional operations may all have input parameters: TID and annotation. For example, TID may be added to the deltas in the cache, and an annotation may be added to each page updated in the transaction (e.g., as if it were being flushed). When installed in the flush buffer and committed, all updated pages in the cache may have flush deltas prepended describing their location (e.g., as if they were flushed independently of a transaction).

The BW-TREE (see, e.g., J. Levandoski, et al., "The Bw-Tree: A B-tree for New Hardware Platforms," 29th *IEEE International Conference on Data Engineering* (ICDE 2013), Apr. 8-11, 2013) may provide an example key-value store that may enable user transactions to be supported (e.g., for the transactional component 202). For example, it may manage LSNs, enforce the write-ahead log (WAL) protocol, and respond to checkpointing requests as expected by a DEUTERONOMY data component (DC) (see, e.g., J. Levandoski et al., "Deuteronomy: Transaction Support for Cloud Data," *Conference on Innovative Data Systems Research* (CIDR) (January 2011), pp. 123-133 and D. Lomet et al., "Unbundling Transaction Services in the Cloud," *Conference on Innovative Data Systems Research* (CIDR), 2009). A discussion herein includes addressing how it may accomplish that when using an example system such as LLAMA.

"Data" content to the Update-D and Update-R LLAMA operations may include keys, LSNs, and the "data part" of a key value store. For example, a BW-TREE may thus, via these operations, implement a key value store, provide idempotence via LSNs, perform incremental updates via Update-D, perform its page consolidations via Update-R, and access pages for read or write using the LLAMA Read or Flush operation. For example, the system may include a record manager that may be configured to control updates based on update delta record operations and replacement update operations.

For example, an access method may store LSNs in the data it provides to LLAMA via update operations. Further, the Flush operation annotation parameter, stored in a flush delta, may provide additional information to describe page contents. For example, these may permit the BW-TREE to enforce write-ahead logging (WAL). For example, a Stabilize operation (e.g., Mk-Stable) after flushing a page may make updates stable for transaction log checkpointing.

For example, Allocate and Free operations may permit an example BW-TREE implementation to grow and shrink its tree. For example, BeginTrans (e.g., TBegin) and Commit/Abort (e.g., TCommit/TAbort) may enable the atomicity expected when performing structure modifications operations (SMOs).

For example, Update operations (e.g., Update-D/Update-R) may not be limited to "user level" data. For example, a BW-TREE may use Update-D to post its "merge" and "split" deltas when implementing SMOs, as discussed further below, with regard to system transactions.

Figure 4A:
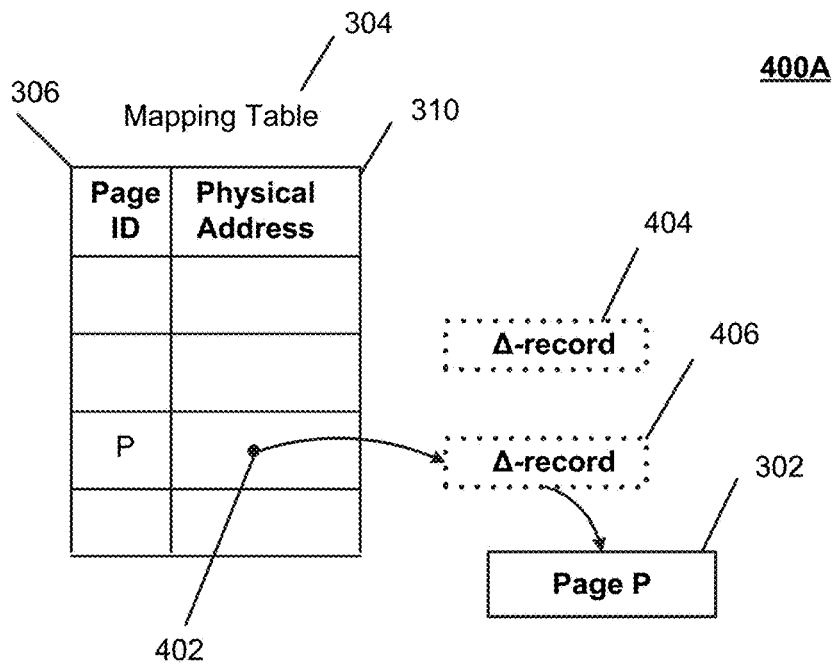
FIGS. 4A-4B illustrate example delta updates on an example mapping table.
Figure 4B:
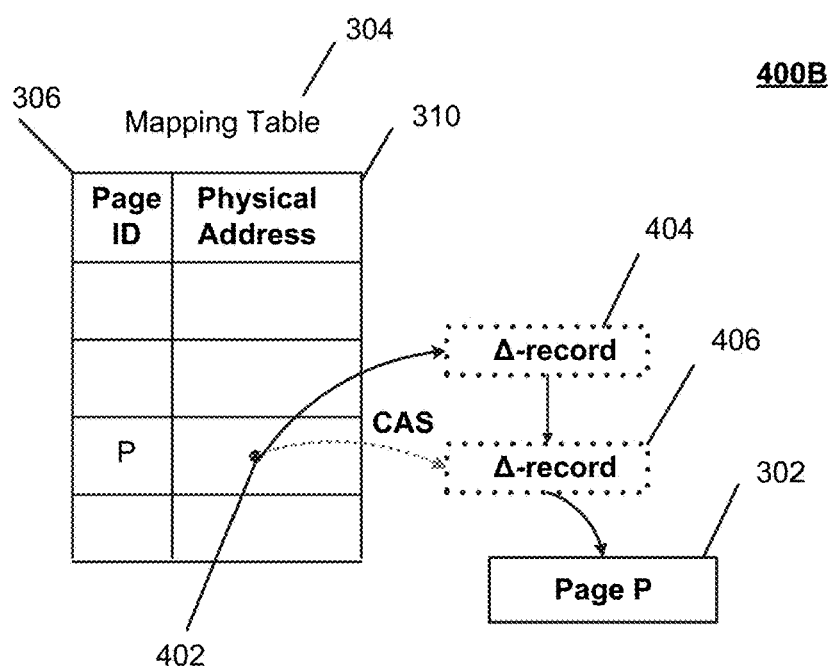

In accordance with example techniques discussed herein, with respect to cache layer data operations, page updating may be accomplished by installing a new page state pointer 402 in the mapping table 304 using a compare and swap operation (CAS), whether a delta update, as shown in FIG. 4, or a replacement update (e.g., as discussed further below with regard to FIG. 7). For example, a replacement update (e.g., Update-R(PID, in-ptr, out-ptr, data)) may include both the desired new state and the location of the prior state of the page in LSS. For example, a new update delta 404 (e.g., Update-D(PID, in-ptr, out-ptr, data)) points to the prior state 406 of the page 302, which already includes this LSS location.

For example, such a latch-free approach may avoid the delays introduced by latching, but it may incur a penalty of its own, as do "optimistic" concurrency control methods, i.e., the CAS may fail and the update will then be re-attempted. For example, it may be left to an example LLAMA user to retry its operation as appropriate, as an example LLAMA implementation may indicate when a failure occurs.

In accordance with example techniques discussed herein, while no operation may block when the data is in cache (e.g., 312), reading a page from secondary storage may involve waiting for the page to appear in the cache. The mapping table (e.g., the mapping table 304) will point to the LSS page, even for cached pages, as discussed above, enabling pages to be moved between cache and LSS for effective cache management.

In accordance with example techniques discussed herein, when a page is flushed, an example LLAMA implementation may ensure that what is represented in the cache (e.g., 312) matches what is in LSS (e.g., 314). Thus, the flush delta may include both PID and LSS offset in the flush delta, and may include that delta in the LSS buffer and in the cache (e.g., 312) by prepending it to the page 302.

In accordance with example techniques discussed herein, because an example LLAMA implementation may support delta updating, page state may include non-contiguous pieces. Combining this feature with flushing activity may result in an in-cache page having part of its state in LSS (having been flushed earlier), while recent updates may be present only in the cache. When this occurs, it may be possible to reduce the storage cost of the next flush.

Thus, an example LLAMA implementation may flush such a page by writing a delta that includes only the changes since the prior flush. For example, multiple update deltas in the cache may all be made contiguous for flushing by writing a contiguous form of the deltas (which may be referred to herein as a "C-delta"), with a pointer to the remainder of the page in LSS. Thus, the entire page may be accessible in LSS, but in possibly several pieces.

In accordance with example techniques discussed herein, the Flush operation may observe a cached page state that may have several parts that have been flushed over time in this manner, resulting in a cached page in which the separate pieces and their LSS addresses are represented. In accordance with example techniques discussed herein, at any time, Flush may bring these pieces together in LSS storage by writing the contents of the discontiguous page pieces contiguously (and redundantly). For example, a user may be willing to leave the pieces separate when LSS uses flash storage, while desiring contiguity when LSS uses disk storage, due to the differing read access costs.

In accordance with example techniques discussed herein, when a page is flushed, it may be desirable for a system to know, prior to the flush, what state of the page is being flushed. For example, this may be easily ascertained using latches, as a system may simply latch the page, and perform the flush. However, in a latch-free approach, the system may have substantial difficulty in preventing flushing of updates to a page prior to it being flushed. For example, this may pose issues in enforcement of a write-ahead log protocol, or when the flush occurs as part of a structure modification. For example, it may be desirable for inappropriate flushes to fail when they perform their CAS. Thus, in accordance with example techniques discussed herein, the pointer to the page state to be flushed in the CAS may be used, which may then only capture that particular state and may fail if the state has been updated before the flush completes. However, this may raise other issues.

In researching the example techniques discussed herein, difficulties were encountered in determining the kind of strong invariant that may be advantageous when performing cache management and flushing pages to LSS. For example, an invariant may include properties such as:

A page that is flushed successfully to LSS is immediately seen in the cache as having been flushed, and the flushed state of the page will be in the LSS I/O buffer ahead of the flushes of all later states. A page whose flush has failed will not appear as flushed in the cache, and it will be clear when viewing LSS that the flush did not succeed.

For example, two alternative approaches may include:
1) Success of the flush may be ensured by first performing the CAS. Once the CAS succeeds, the page may be posted to the LSS. For example, if that is done, a race condition may undermine trustworthy LSS recovery. For example, a page may subsequently be flushed that depends upon the earlier flush, where this "later" flush succeeds in writing to LSS before a system crash, while the "earlier" flush is too slow to complete and does not appear in the stable LSS. This situation may compromise a form of causality.
2) The page state of the page that is desired to be flushed may be captured, and written to the LSS buffer. Then the CAS may be attempted, and the CAS may fail. Thus, a page is written to LSS with no indication for distinguishing whether the flush succeeded or failed should the system crash. For example, there may be multiple such pages written to LSS at various times. For example, a later state of the page may be written that appears earlier in the LSS than the failed CAS. As indicated above, it began later but obtained its buffer slot before the earlier flush.

In accordance with example techniques discussed herein, the dilemma discussed above may be resolved, as discussed below. For example, if the CAS is performed early enough, then it may be determined whether the flush will be successful or not, prior to copying the state of the page to the log buffer. Thus, an example flush procedure may be performed as follows:

Step 1: Identify the state of the page that is intended to be flushed.
Step 2: Seize space in the LSS buffer into which to write the state.
Step 3: Perform the CAS to determine whether the flush will succeed. The LSS offset in the flush delta will be obtained in order to do this (as provided in step 2 above).
Step 4: If step 3 succeeds, write the state to be saved into the LSS. While this is being written into the LSS, example LLAMA techniques discussed herein may prevent the buffer from being written to LSS secondary storage.
Step 5: If step 3 fails, write an indication indicating "Failed Flush" into the reserved space in the buffer. This may consume storage but resolves ambiguity as to which flushes have succeeded or failed.

The result of this example procedure is that the LSS, during recovery, might not observe pages that are the result of CAS's that have failed. For example, this also preserves the property that any page that appears later in the LSS (in terms of its position in the "log") will be a later state of the page than all earlier instances of the page in the LSS log.

In accordance with example techniques discussed herein, it may be desirable for an example LLAMA implementation to manage the cache and swap out data so as to meet its memory constraints. For example, the example LLAMA implementation may be aware of delta updates, replacement updates, and flushes, and may recognize each of these.

However, the example LLAMA implementation will know nothing about the contents of the pages, if it is to be general purpose. Thus, the example LLAMA implementation is unaware whether the access method layer is supporting transactions by maintaining LSN's in the pages. Thus, an issue that may be posed includes a potential question regarding how an example LLAMA implementation may provide cache space management (including evicting pages) when it may not see LSN's and enforce the write-ahead log protocol.

In accordance with example techniques discussed herein, any data that has already been flushed may be dropped from the cache. For example, systems in which pages are updated in place may be prevented from swapping out (dropping from the cache) any recently updated and "dirty" page. However, because of delta updates, an example LLAMA implementation may determine which parts of pages have already been flushed. For example, each such part may be described with a flush delta, and those flushed parts may be "swapped out" of the cache.

In "swapping out" parts of pages, it may be undesirable to simply deallocate the storage and reuse it, as that may leave dangling references to the swapped out parts. Thus, in accordance with example techniques discussed herein, a delta may be used that describes what parts of a page have been swapped out.

For example, for a fully swapped out page, its main memory address in the mapping table 304 may be replaced with an LSS pointer from the page's most recent flush delta.

Figure 5:
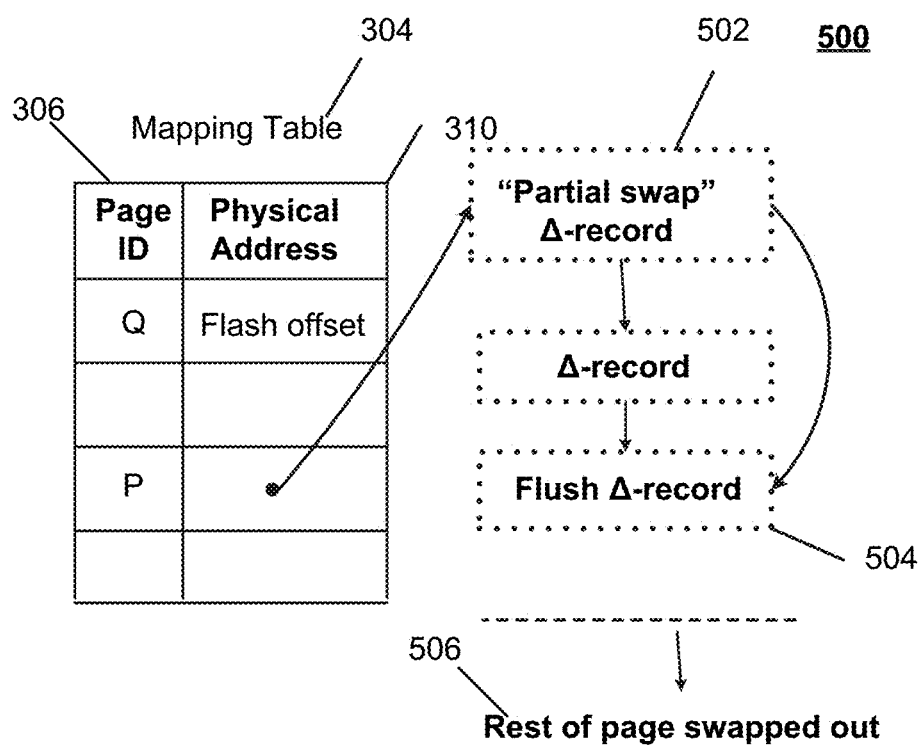
FIG. 5 depicts an example partial page swap out and an example partial swap delta.

FIG. 5 depicts an example partial page swap out and an example partial swap delta. For example, for partially swapped out pages, a CAS may be used to insert a "partial swap" delta record 502. For example, this delta record 502 may indicate that the page has been partially swapped out (e.g., so none of the page can be accessed normally), and may point to a flush delta record 504 that indicates location information in the LSS for locating the missing part of the page 506. For example, once the "partial swap" delta 502 has been installed with a CAS, the memory for the part of the page being dropped may be freed using an example epoch mechanism, as discussed further below.

For example, a page manager may be configured to initiate a swap operation of a portion of a first page in cache layer storage to a location in secondary storage, based on initiating a prepending of a partial swap delta record to a page state associated with the first page, the partial swap delta record including a secondary storage address indicating a storage location of a flush delta record that indicates a location in secondary storage of a missing part of the first page.

For example, the page manager may be further configured to initiate a free operation for cache layer storage associated with the portion of the first page, using an epoch mechanism.

In accordance with example techniques discussed herein, this approach may advantageously provide several useful features for users. For example, such an example LLAMA implementation's cache layer (e.g., 312) may reclaim memory without knowledge regarding the actual content of pages. For example, dropping flushed pages and flushed parts of pages may involve no I/O operation. For example, bringing a partially flushed page back into main memory may involve fewer LSS reads than would be the case for a fully flushed page with multiple parts in LSS.

For example, several example cache management strategies may be used to manage cache storage (e.g., least recently used (LRU), LRU(k), Clock, etc.—see, e.g., W. Effelsberg et al., "Principles of database buffer management," *ACM Transactions on Database Systems* (TODS), Vol. 9, Issue 4 (December 1984), pp. 560-595 and E. O'Neil et al., "The LRU-K page replacement algorithm for database disk buffering," *Proceedings of the* 1993 *ACM SIGMOD International Conference on Management of Data* (SIGMOD '93), pp. 297-306). These examples may involve additional bookkeeping, but may pose no substantial difficulties.

In accordance with example techniques discussed herein, using such an example latch-free approach, operations may be examining both pages and page states even after they have been designated as "garbage." For example, when not using conventional "latches," the system may fail to prevent either of 1) an Update-R operation replacing the entire page state, de-allocating prior state while another operation is reading it; or 2) a De-allocate operation that "frees" a page in the mapping table while another operation is examining it.

In accordance with example techniques discussed herein, neither storage nor PIDs may be allowed to be reused until there is no possibility that another operation is accessing them. Thus, a distinction may be established between a "freed resource" and a "re-usable resource." For example, a "freed resource" has been designated as garbage by an operation. For example, a "re-usable resource" has been freed and may be ensured not to be accessible by any other operation. For example, epochs may be used to protect de-allocated objects from being re-used too early (see, e.g., H. Kung et al., "Concurrent manipulation of binary search trees," *ACM Transactions on Database Systems* (TODS), Vol. 5, Issue 3 (September 1980), pp. 354-382).

In accordance with example techniques discussed herein, every operation may enroll in a current epoch E prior to accessing PID's or page states, and may exit E once such access is completed. For example, an operation may always post freed resources on a list of the current epoch, which may be E (the epoch it joined), or a later epoch if the current epoch has advanced. For example, no resource on E's list may be reused until all operations enrolled in E have exited.

For example, epochs may be numbered, and from time to time, a new epoch E+1 may become the "current" epoch. New operations may thus continue to enroll in the current epoch, now E+1. For example, an epoch mechanism invariant is: No operation in epoch E+1 or later epochs can have seen, and be using, resources freed in epoch E.

Figure 6:
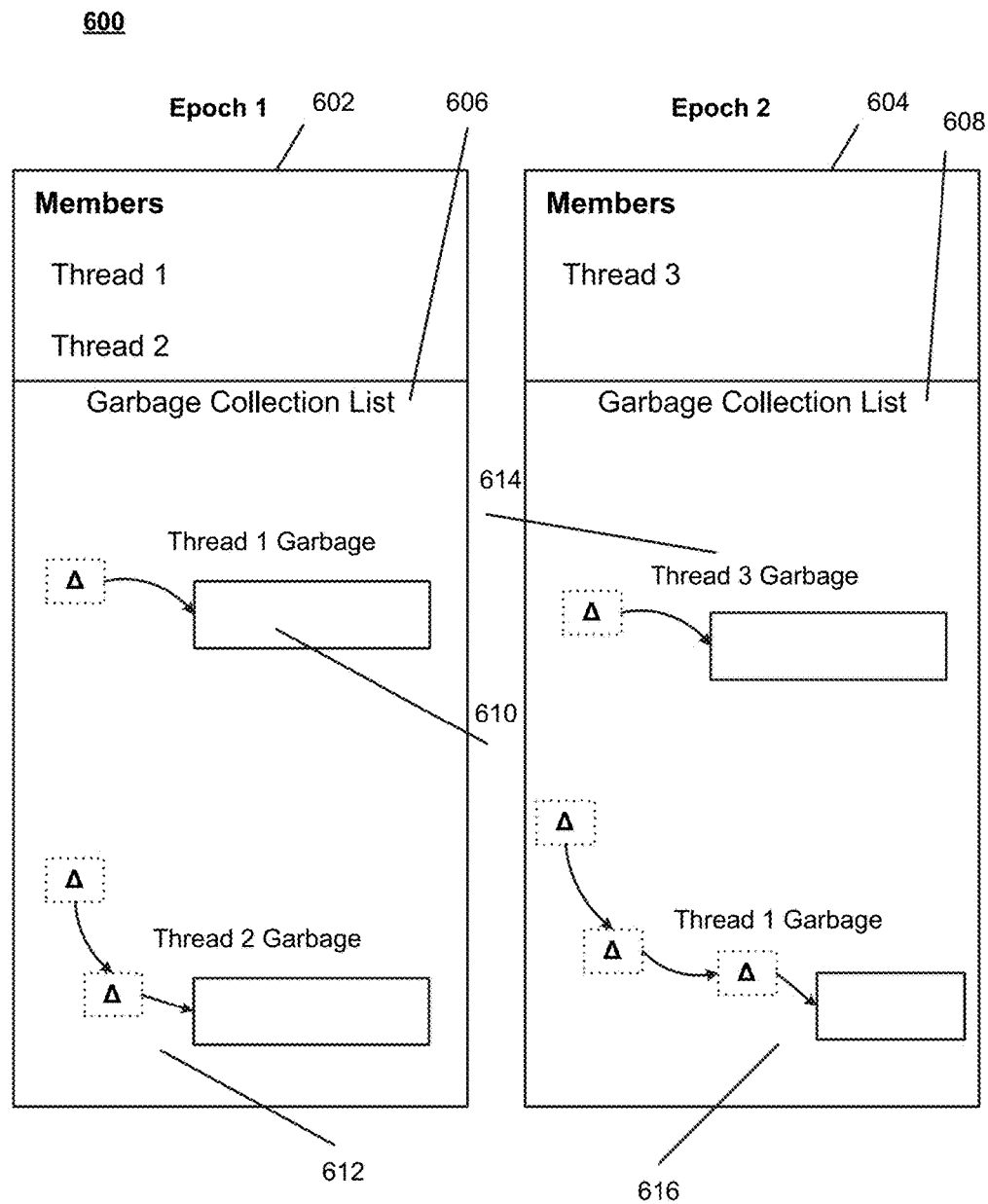
FIG. 6 illustrates example epochs and their respective garbage collection lists.

Thus, based on this invariant, once all operations have exited from E, no active operation can access resources freed in E. FIG. 6 illustrates two example epochs 602, 604 and their respective garbage collection lists 606, 608. As shown in FIG. 6, a garbage collection item 610 is associated with "Thread 1" in Epoch 1 (602), a garbage collection item 612 is associated with "Thread 2" in Epoch 1 (602), and a garbage collection item 614 is associated with "Thread 3" in Epoch 2 (604). As shown in FIG. 6, a garbage collection item 616 in the garbage collection list 608 of Epoch 2 (604), is associated with "Thread 1" of Epoch 1 (602).

For example, once "Thread 1" and "Thread 2" have exited from Epoch 1 (602), no active operation can access resources freed in Epoch 1 (602) (e.g., garbage collection item 610 and garbage collection item 612).

For example, a first epoch manager may be configured to initiate enrollment of a first processor operation in a first epoch enrollment list, prior to accessing page information by the first processor operation.

The first epoch manager may be configured to post one or more resources freed by the first processor operation in a first epoch garbage collection list. The first epoch manager may block reuse of the posted resources that are posted in the first epoch garbage collection list until the first epoch enrollment list includes no currently enrolled processor operations.

In accordance with example techniques discussed herein, an example LLAMA implementation may organize data on secondary storage (e.g., flash storage) in a log structured manner (see, e.g., M. Rosenblum et al., "The Design and Implementation of a Log-Structured File System," *ACM Transactions on Computer Systems* (TOCS), Vol. 10, Issue 1, February 1992, pp. 26-52) similar to a log structured file system (LFS). Thus, each page flush relocates the position of the page on flash. For example, this may provide an additional reason for using the example mapping table 304 discussed herein. For example, log structured storage may advantageously reduce the number of writes per page, and make the writes "sequential." Thus, many random writes may be converted into one large multi-page write.

Figure 7A:
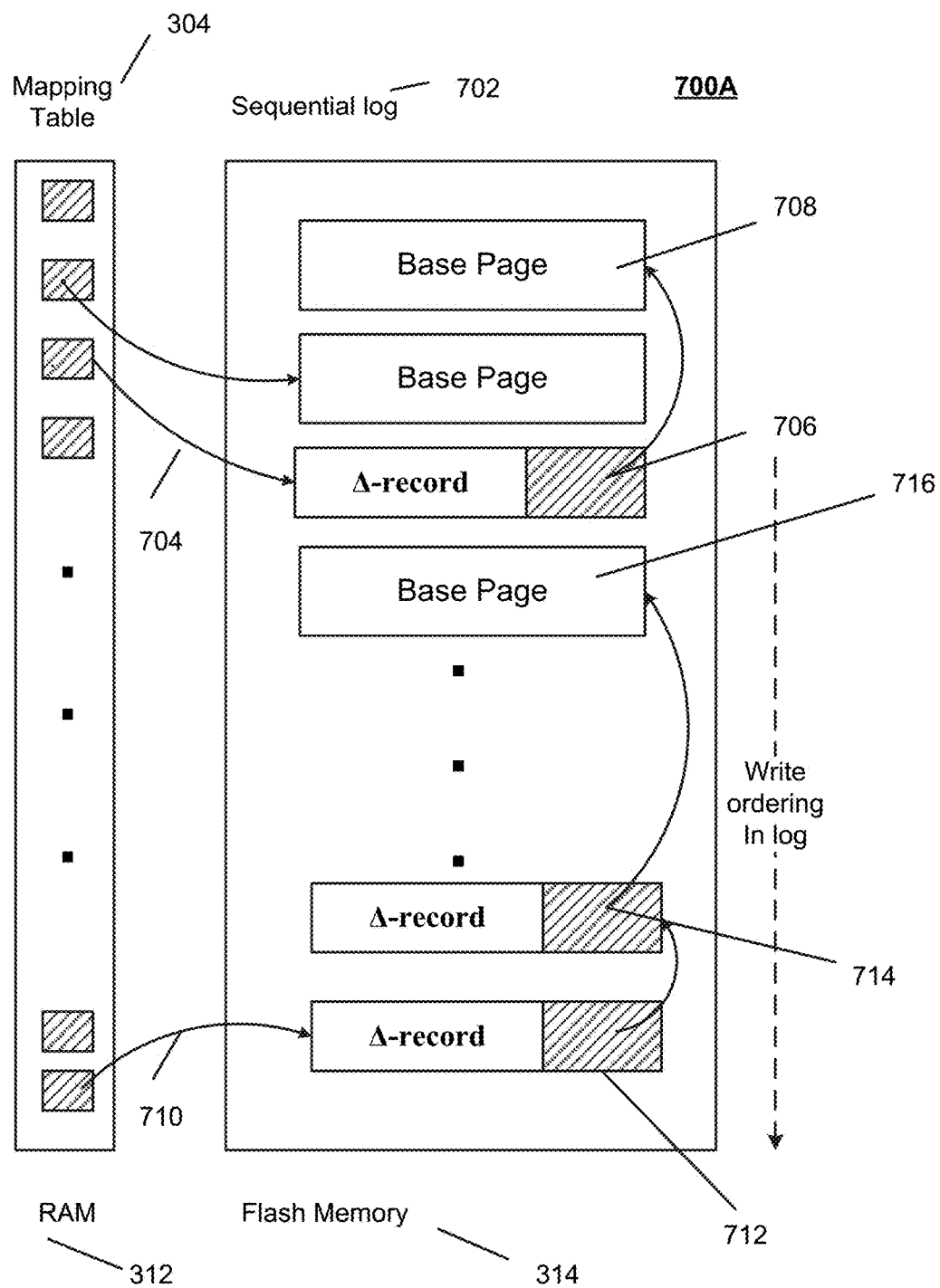
FIGS. 7A-7C illustrate an example log-structured storage organization on flash.

As discussed above, a "logical page" may include a base page and zero or more delta records indicating updates to the page, thus allowing a page to be written to flash in pieces when it is flushed. Thus, a logical page on flash may correspond to records potentially on different physical device blocks that are linked together using file offsets as pointers. Further, a physical block may include records from multiple logical pages. FIG. 7A illustrates an example log-structured storage organization 700A on flash 314.

For example, a logical page may be read from flash 314 into memory (e.g., RAM 312) by starting from the head of the chain on flash (whose offset in a sequential log 702 may be obtained from the mapping table 304) and following the linked records. For example, an offset 704 may be obtained from the mapping table 304, for accessing a delta record 706, to obtain a current state, and a base page 708, for reading the corresponding "logical page" from flash 314 into memory 312.

For example, an offset 710 may be obtained from the mapping table 304, for accessing a delta record 712, to obtain the delta and link, to access a second delta record 714, and subsequently a base page 716, for reading the corresponding "logical page" from flash 314 into memory 312.

For example, the flush process may advantageously consolidate multiple delta records of the same logical page into a contiguous C-delta on flash when they are flushed together. Moreover, a logical page may be consolidated on flash when it is flushed after being consolidated in memory, which may advantageously improve page read performance.

Figure 7B:
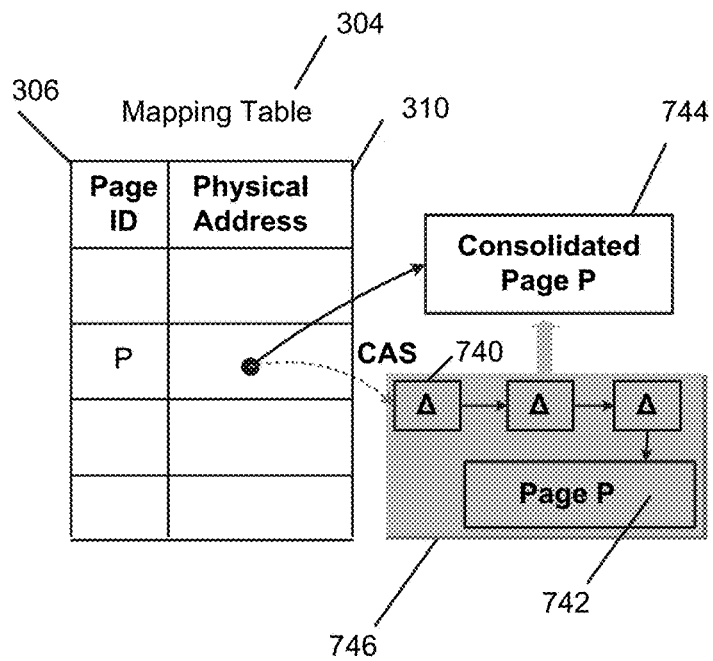

FIG. 7B depicts the example mapping table 304, indicating a replacement of a prior state 740 of a page 742 with the new state 744 of the page 742, based on replacing a physical address of first storage object 746 (e.g., which includes the base page 742 with a plurality of previously prepended delta records, in FIG. 7B) with a physical address of the new state 744 of the page 742 (e.g., resulting from a consolidation of the page 742 with the previously prepended delta records).

Figure 7C:
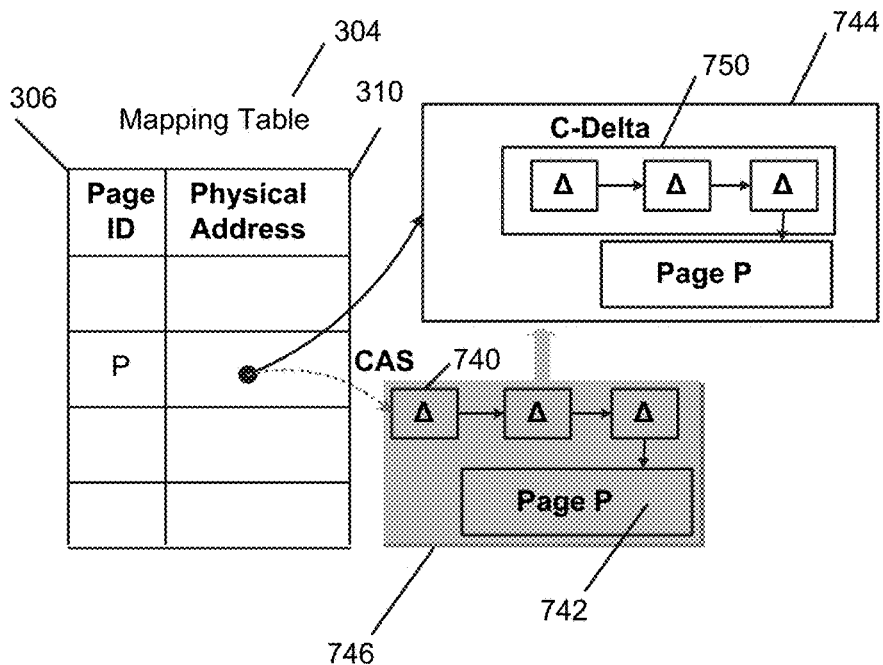

For example, as shown in FIG. 7C, replacing the prior state 740 of the page 742 with the new state 744 of the page 742 may include consolidating the plurality of delta records into a contiguous C-delta 750, which may then be flushed, together with the base page 742.

For example, replacing the prior state 740 of the page 742 with the new state 744 of the page 742 may include generating a modified version of the current page 742, or determining another page for replacing the current page 742, and replacing a physical address of the current page 742 with a physical address of the new state 744 of the page 742 (e.g., the modified version or the other page for replacement), via an atomic compare and swap operation on the mapping table 304.

For example, as a distinction between the features of FIG. 7B and FIG. 7C, when writing a page to secondary storage, LLAMA may perform the consolidation illustrated in FIG. 7C, but it depends upon the access method, executing an Update-R, to perform the consolidation of FIG. 7B.

In accordance with example techniques discussed herein, an example LLAMA implementation may be entirely latch-free. Further, dedicated threads might not be used to flush an I/O buffer, as this may complicate keeping thread workload balanced. Thus, all threads may participate in managing this buffer. For example, conventional approaches have utilized latches. However, such conventional techniques might only latch while allocating space in the buffer, releasing the latch prior to data transfers, which may then proceed in parallel.

In accordance with example techniques discussed herein, an example LLAMA implementation may avoid conventional latches for buffer space allocation, instead using a CAS for atomicity, as done elsewhere in the example systems discussed herein. For example, this involves defining the state on which the CAS executes. For example, the constant part of buffer state may include its address (Base) and size (B size). For example, the current high water mark of storage used in the buffer may be tracked with an Offset relative to the Base. For example, each request for the use of the buffer may begin with an effort to reserve space Size for a page flush.

In accordance with example techniques discussed herein, to reserve space in the buffer, a thread may acquire the current Offset and compute Offset+Size. For example, if Offset+Size≤B size then the request may be stored in the buffer. For example, the thread may issue a CAS with current Offset as the comparison value, and Offset+Size as the new value. If the CAS succeeds, Offset may be set to the new value, the space may be reserved, and the buffer writer may transfer data to the buffer.

In accordance with example techniques discussed herein, this logic may handle space allocation in the buffer. For example, writing the buffer and managing multiple buffers may involve more in the CAS state, which is further discussed below.

In writing the buffer to secondary storage, if Offset+Size>Bsize, there is insufficient space in the buffer to hold the thread's record. In this case, the thread may seal the buffer, thus marking it as no longer to be used, and as prepared to be written to secondary storage. This condition may be tracked with a "Sealed" bit in the flush buffer state. For example, a CAS may change the "Sealed" bit from F (e.g., false) to T (e.g., true). For example, a sealed buffer may no longer be updated, and a thread encountering a sealed buffer will seek a different (unsealed) buffer.

In accordance with example techniques discussed herein, a sealed buffer may no longer accept new update requests. However, the example system may not yet be assured that the prior writers, all of whom have succeeded in acquiring buffer space, have finished transferring their data to the buffer. In accordance with example techniques discussed herein, an "Active" count may indicate the number of writers transferring data to the buffer. For example, when reserving space in the buffer, the writer's CAS may include values representing Offset, Sealed, and Active. For example, the writer's CAS may acquire this structure, add its payload size to Offset, increment "Active" by 1, and if ~Sealed, may perform a CAS to update this state and reserve space. For example, when a writer is finished, it may reacquire this state, decrement "Active" by one, and may perform a CAS to effect the change. For example, operations may be redone as needed in case of failure.

For example, a buffer may be flushable if it is Sealed and Active=0. For example, a writer that causes this condition may be responsible for initiating the I/O. For example, when the I/O is completed, the buffer's Offset and Active users may both be set to zero, and the buffer may be unSealed.

Figure 8:
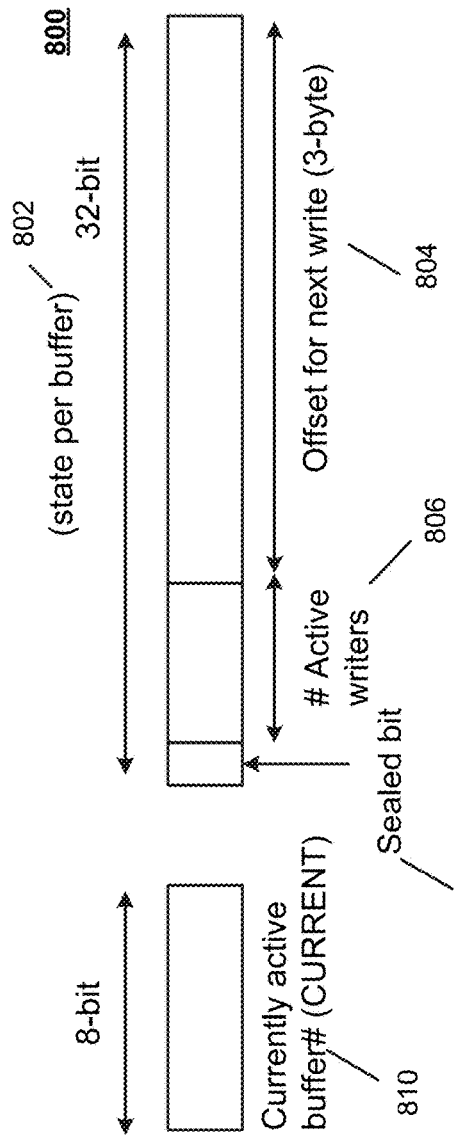
FIG. 8 depicts an example flush buffer state.

In accordance with example techniques discussed herein, for multiple buffers, each of the buffers in a set of a plurality of buffers has a state as indicated above. FIG. 8 depicts an example complete flush buffer state 800. As shown in the example of FIG. 8, a state per buffer 802 may include 32 bits, including 24 bits for an offset for next write 804, 7 bits for a number of active writers 806, and 1 bit for a "sealed bit" indicator 808 (e.g., indicating a sealed buffer). For example, a currently active buffer number (CURRENT) 810 may indicate a currently active buffer (e.g., for 8 bits, as shown).

For example, buffers may be accessed and used in a round-robin style, such that as one buffer is sealed (as indicated by the sealed bit indicator 808), example techniques herein may proceed to the next buffer in the buffer "ring" (e.g., using CURRENT 810). In accordance with example techniques discussed herein, CURRENT 810 may be used to indicate which of a set of buffers is currently accepting new write requests.

In accordance with example techniques discussed herein, the thread that SEALs a currently active buffer (e.g., via the "sealed bit" indicator 808) will also update CURRENT 810 when it SEALs the buffer. For example, this thread may then select the next CURRENT buffer. For example, when a buffer I/O completes, the I/O thread may unseal the buffer but may not set CURRENT 810, as there may be another buffer serving as the current buffer.

LSS is a log structured store, and so is conceptually "append only." For example, a realization of LSS may involve continuously reclaiming space for the appending of new versions of pages, as with any typical log structured file system (LFS). For example, this technique may be referred to herein as "cleaning" (see, e.g., M. Rosenblum et al., supra).

Because different versions of example pages may have different lifetimes, it is possible that old portions of the example "log," which may be desirable to reuse, will include current page states. For example, to reuse this "old" section of the example log, the still current page states may be moved to the active tail of the log, appending them there so that the older portion may be recycled for subsequent use. For example, this side effect of cleaning may increase the number of writes (which may be referred to herein as "write amplification"—see, e.g., X.-Y. Hu et al., "Write amplification analysis in flash-based solid state drives," In *Proceedings of SYSTOR* 2009: *The Israeli Experimental Systems Conference* (SYSTOR '09), Article No. 10).

For example, the cleaning effort may be simply organized. For example, the log may be managed as a large "circular buffer" in which the oldest part (e.g., head of the log) may be "cleaned" and added as new space at the active tail of the log where new page state is written.

In accordance with example techniques discussed herein, each page that is relocated is made contiguous when it is re-written (e.g., when a page is re-appended to the LSS store, the "rewritten" matter is contiguous). Thus, as many incremental flushes as it may have had, all parts of the page are now made contiguous, thus advantageously optimizing the accessibility of the page in LSS.

In accordance with example techniques discussed herein, a CAS on a delta (which may be referred to herein as a "relocation delta") may be performed at the mapping table entry for the page, providing the new location and describing which parts of the page have been relocated (i.e., managing the cache so as to install the new location information). For example, a concurrent update or flush may cause this CAS to fail, in which case the CAS is attempted again.

Storage efficiency may have an advantageous positive impact on log structured storage systems. In accordance with example techniques discussed herein, for any given amount of space allocated to LSS, the more efficiently it uses that space, the less cleaning it may perform, which may involve fewer page moves. For example, page moves may result in additional writes to storage (e.g., write amplification).

With regard to potential LSS storage efficiency, there is no empty space in pages that are flushed. For example, they may be written as packed variable length strings (e.g., on average, conventional B-TREE pages may be only 69% utilized). Further, because only deltas since the prior flush might frequently be flushed, less space may be consumed per page flush. Additionally, swapping updated pages out of cache will not involve an additional flush, as main memory in cache may be reclaimed only for the parts of the page previously flushed.

One example aspect of access methods is that they make structure modifications operations (SMO's) to permit such structures to grow and shrink. For example, SMO's expect that there will be a way to effect atomic changes of the index so that ordinary updates can execute correctly in the presence of on-going SMO's, and be atomic (all or nothing). For example, an example BW-TREE may exploit system transactions as the mechanism for its SMO's.

In accordance with example techniques discussed herein, durability of system transactions may be realized via a log. However, some example logs discussed herein are not transaction logs, but example LSS "page" stores, which may seem somewhat inefficient given that a transactional system may typically only log operations. However, with delta updating, page state may be logged by logging only the delta updates since the prior page flush. Durability at commit is not involved, so commit does not "force" the LSS buffer. However, in accordance with example techniques discussed herein, all subsequent operations that use the result of a transaction may be ensured to occur after the transaction commit in the LSS.

In accordance with example techniques discussed herein, similarly to non-transactional operations, all transaction operations may be installed via a CAS on a page pointer in the mapping table. Example techniques discussed herein may ensure that content in the cache is represented faithfully in LSS and the reverse. Thus, substantially all updates within a system transaction may include a flush operation. For example, every system transaction update may be recorded in the LSS buffer, and hence may be "logged." For example, the two representations of the information may be equivalent, thus ensuring that, in case of a system crash, the state of the cache may be faithfully reconstructed as of the last buffer stably captured by LSS.

This equivalence may conventionally be problematic when actions involve more than one page, as with SMO's. For example, a node split SMO in a B-LINK tree both allocates a new page and updates its sibling page link pointer to reference the new page. For example, SMO's in latch-based systems may typically use latches to provide isolation so that the internal states of a multi-page SMO are not visible in the cache manager until the SMO is complete. For example, a latch-free design may mean that the ability to isolate active (and hence uncommitted) transaction updates may be limited.

In accordance with example techniques discussed herein, an example LLAMA implementation may provide a transactional interface that permits substantially arbitrary access to pages (i.e., operations on arbitrary pages may be placed within a transaction). However, pages updated during a transaction may not be protected from access by an operation external to the transaction. However, In accordance with example techniques discussed herein, SMO's may be designed that do not involve a fully general isolation capability. For example, FIG. 9 illustrates an example transaction template 900 that may be used for capturing SMO transactions.

For example, in step 1 (902), pages are allocated or freed in the mapping table. In step 2 (904), pages are updated as needed. In step 3 (906), an existing page is updated so as to connect the new pages to the rest of the index or to remove an existing page while updating another page.

Figure 9:
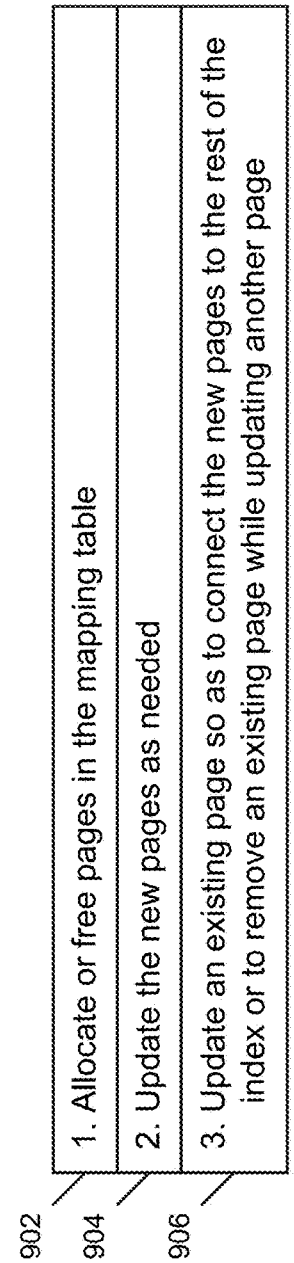
FIG. 9 illustrates an example transaction template.

In accordance with example techniques discussed herein, a new node for a node split (using the example template of FIG. 9), is not visible to other threads until step 3 of FIG. 9, when it is connected to the tree and the transaction is committed. Thus, such an SMO transaction may provide both atomicity and isolation.

Somewhat similarly to conventional transactional systems, an active transaction table may be maintained for system transactions, which may be referred to herein as the active transaction table (ATT). For example, the ATT may include an entry, per active system transaction, that includes the transaction id (TID) for the transaction and a pointer to the immediately prior operation of the transaction (which may be referred to herein as "IP" (for "immediately prior")), which points to (or otherwise references) the memory address of the most recent operation of the transaction.

For example, a BeginTrans operation (e.g., TBegin) may add a new entry to the ATT, with a transaction id (TID) higher than any preceding transaction, with IP set to a value of NULL. For example, execution of a transaction operation may create a "log record" for the operation, pointing back to the log record for the operation identified by the IP, and IP may be updated to reference the new operation. For example, this may serve to backlink the "log records" for operations of a transaction, with all "log records" in main memory. Further, in accordance with example techniques discussed herein, operations within a system transaction may only change cache state via mapping table updates (i.e., not LSS buffer state). In accordance with example techniques discussed herein, these pages may be flushed on transaction commit. In accordance with example techniques discussed herein, when an end of transaction (commit or abort) occurs, the transaction may be removed from the ATT.

For example, a system transaction manager may be configured to add a transaction identifier (TID) of a first transaction to an active transaction table (ATT) that is maintained by a cache layer manager. For example, a transaction commit manager may be configured to commit the first transaction based on removing the TID from the ATT, installing page state changes that are associated with the first transaction in the mapping table, and initiating a flush of the page state changes that are associated with the first transaction to the secondary storage buffer.

In accordance with example techniques discussed herein, at the time of a commit operation, pages changed by a transaction will be flushed to the LSS buffer in an atomic fashion. As an example technique, these page writes may be bracketed with begin and end records for the transaction in the LSS; however, this may involve crash recovery to undo interrupted transactions. For example, such undo recovery may involve the writing of undo information to LSS. In accordance with example techniques discussed herein, this may be avoided by performing an atomic flush at commit of all pages changed by a transaction, as discussed further below.

In accordance with example techniques discussed herein, subsequent actions that depend on an SMO will appear later in the LSS buffer than the information describing the SMO transaction. Thus, when the state of an SMO becomes visible in the cache to threads other than the thread working on the system transaction, those other threads may depend upon the SMO having been committed to the LSS, and already present in the LSS buffer.

As shown in FIG. 9, step 3 indicates "Update an existing page so as to connect the new pages to the rest of the index or to remove an existing page while updating another page." Thus, example techniques discussed herein may encapsulate both the updating in main memory (making the transaction state visible) and the committing of the transaction in the LSS buffer via an atomic flush, using an example "commit" capability for an Update-D to accomplish this (i.e., combining an update with transaction commit).

In accordance with example techniques discussed herein, LSS may enable a transactional Update-D "commit" operation by combining the update and its CAS installation with an atomic flush of all pages changed in the transaction. For example, this flush on commit of multiple pages may be performed similarly as for individual page flushes. For example, LSS buffer space may be allocated for all pages changed in the transaction. Then the CAS may be executed that installs the Update-D delta prepended with a flush delta. If the CAS succeeds, the pages updated in the transaction may be written to the LSS flush buffer. After the flush of all pages for the transaction is complete, the flush process may decrement the number of writers of the flush buffer. For example, the allocation of space for all pages in the transaction as a single unit, with the hold until writer decrement on the LSS buffer, may ensure atomicity for the transaction in the LSS store.

For example, a transaction commit manager may be configured to install an update delta record that is associated with a transaction in a mapping table, via a compare and swap (CAS) operation, the update delta record prepended with a flush delta record. For example, the transaction commit manager may be configured to determine whether the CAS operation succeeds. If the transaction commit manager determines that the CAS operation succeeded, the transaction commit manager may initiate a write operation to write pages updated in the transaction to a secondary storage flush buffer.

In accordance with example techniques discussed herein, if the CAS fails, a response may proceed similarly as for other flush failures. For example, the space that was allocated so that the LSS, during recovery, does not confuse the space with anything else, may be VOIDed. Thus, the example recovery process may be completely unaware of system transactions. Rather, system transactions may be solely a capability of the example caching layer. Thus, it may be acceptable to proceed without ensuring TID uniqueness across system crashes or reboots.

In accordance with example techniques discussed herein, operations of an aborted system transaction may be undone in the cache since recovery does not see incomplete transactions. Thus, the back chain of log records for the transaction, which are linked together in main memory, may be followed, and the undo may be provided based on the nature of the operations on the ATT list for the transaction. For example, a delta update may be undone by removing the delta, an allocate may be undone with a "free," and a "free" may be undone by restoring the page to its state prior to the "free." Aside from undoing a "free," no extra information may be desired for these operations, beyond the information describing operation success.

In accordance with example techniques discussed herein, actions that occur within transactions are provisional, including the allocation and freeing of storage and mapping table page entries (PIDs). For example, during transaction execution, PIDs may be allocated or freed, and Update-D deltas may be generated. For example, the management of these resources may be accomplished based on epoch mechanisms, as discussed herein. For example, since an SMO is performed within a single user operation request, the thread may remain in its epoch for the duration of the transaction.

In accordance with example techniques discussed herein, an example LLAMA implementation may reclaim resources depending on transaction commit or abort. For example, for a commit operation, FreePage PIDs may be added to the PID pending free list for the current epoch. For example, for an abort operation, an AllocatePage PID may be freed during undo and similarly added to the PID pending free list. For example, for an Update-D operation, the update delta may be added to the storage pending free list for the current epoch, should the transaction abort.

As discussed herein, "crash recovery" generally is not referring to "transactional recovery." As discussed herein, "checkpointing" generally is not referring to checkpointing as used to manage a transactional log. Rather, as discussed herein, "crash recovery" may refer to example techniques for LSS (e.g., a log structured store) to recover its mapping table of pages and their states to the time of a system crash. This particular type of recovery step is typically not a concern for conventional update-in-place storage systems.

With regard to "crash recovery" as discussed herein, the mapping table may be considered as a type of "database." For example, updates to this database may include the page states flushed to the LSS. Thus, every page flush may update the "mapping table database." Should the system crash, the LSS "log" may be replayed to recover the "mapping table database," using the pages flushed as redo log records to update the mapping table.

In support of the above strategy, the mapping table may be periodically checkpointed, so as to avoid maintaining LSS updates indefinitely. For example, the LFS cleaning techniques discussed above may be used for this purpose (i.e., shortening the recovery log); however, such techniques may leave a recovery log (the LSS log structured store) that is substantially larger than may be desirable for high speed recovery.

Figure 10:
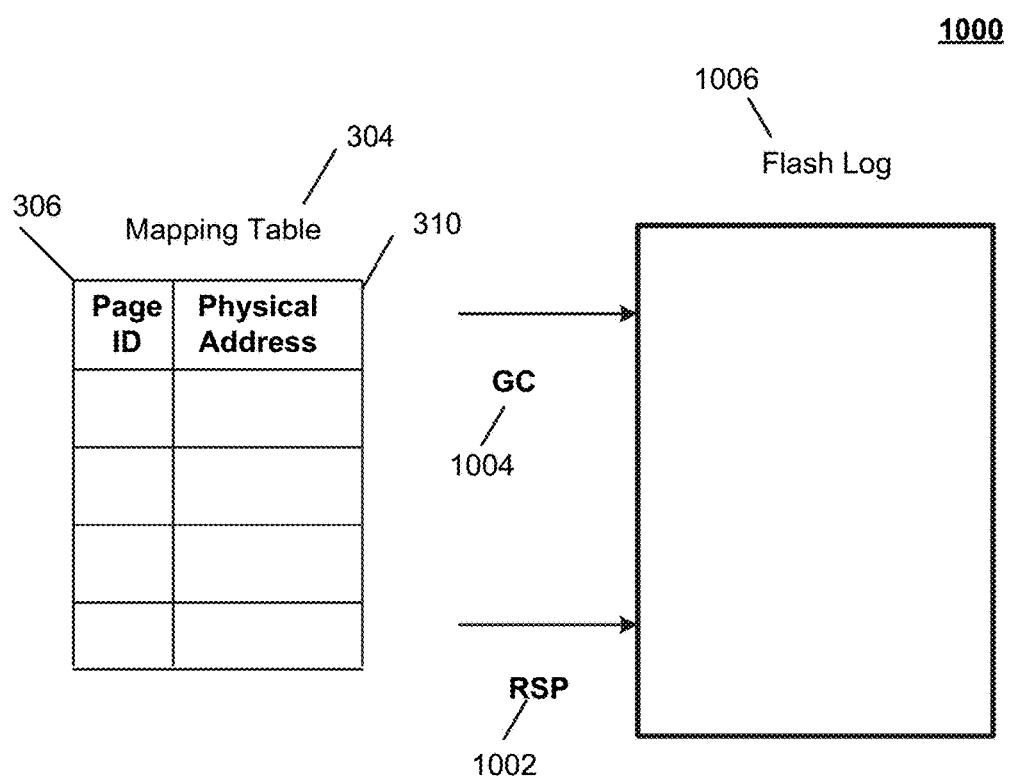
FIG. 10 illustrates example checkpoint data.

In accordance with example techniques discussed herein, an advantageous tactic may be used for checkpointing. For example, an example LLAMA implementation may asynchronously and incrementally write the complete mapping table during a checkpoint to one of two alternating locations. FIG. 10 illustrates example checkpoint data 1000, in accordance with example techniques discussed herein. For example, the two alternating locations may be selected as two different "well-known locations" (WKLs), such that the system will know the locations, even after a system crash that may lose other "current" information regarding locations of various entities. Thus, a pointer may be saved (e.g., using a WKL) that points to information regarding the state of the system, as it existed at the time of a crash. For example, by using two checkpoints, a user may not update in place a "live" checkpoint.

For example, each location, in addition to the complete mapping table, may store a recovery start position (RSP) 1002 and garbage collection offset GC 1004 in a flash log 1006, as shown in FIG. 10. For example, the RSP 1002 may include the end offset in the LSS store at the time of initiating copying of the mapping table 304. For example, the GC offset 1004 may mark the garbage collection "frontier."

In accordance with example techniques discussed herein, later checkpoints have higher RSPs 1002, as LSS offsets monotonically increase by being virtualized. For example, after a system crash, the completed checkpoint with the highest RSP 1002 may be used to initialize the state of the recovered mapping table 304. For example, the RSP 1002 indicates a position in the LSS "log" (1006) for beginning redo recovery. To identify the last complete checkpoint, the RSP 1002 is not written to the checkpoint until the mapping table 304 has been fully captured. Thus, the previous high RSP (from the alternate location) will be the highest RSP 1002 until the current checkpoint is complete.

In accordance with example techniques discussed herein, writing out the mapping table 304 as part of a checkpoint is not a byte-for-byte copy of the mapping table 304 as it exists in the cache. For example, the cached form of the mapping table 304 has main memory pointers in the mapping table entries for cached pages, whereas an example desired checkpoint discussed herein involves capturing the LSS addresses of the pages. As another example, mapping table entries that are not currently allocated are maintained on a free list that uses the mapping table entries as list items. Thus, a free mapping table entry either has zero or the address of the immediately preceding free mapping table entry (in time order based on the time when they were added to the free list). For example, a usable free list may not be captured during asynchronous "copying" of the mapping table as discussed herein. For example, the copy of the mapping table 304, as discussed herein, is written asynchronously and incrementally, which may aid in minimizing the impact on normal execution.

In accordance with example techniques discussed herein, an example LLAMA implementation may first save the current end offset of the LSS store as the RSP 1002, and may save the current LSS cleaning offset as the GC 1004. For example, the mapping table 304 may be scanned (e.g., concurrently with ongoing operations), and the LSS address of the most recent flush of the page for each PID entry (stored in the most recent flush delta) may be identified, and that LSS address may be stored in the example checkpoint for that mapping table 304 entry. For example, if the entry is free, that entry may be zeroed in the checkpoint copy. For example, the free list may be reconstructed at the end of redo recovery. Further, when copying of the mapping table 304 is complete, the previously saved RSP 1002 and GC 1004 may be written to the stable checkpoint area, thus completing the checkpoint.

In accordance with example techniques discussed herein, recovery may be initiated by copying the mapping table 304 for the checkpoint with the highest RSP 1002 (i.e., the latest complete checkpoint) into cache 312. For example, the log 1006 may then be read from RSP 1002 forward to the end of the LSS. For example, each page flush that is encountered may be brought into the cache 312 as if it were the result of a page read.

For example, the content of the page may be read, and the deltas may be set so that the location in LSS is referenced in a flush delta. For example, when an AllocatePage operation is encountered, the mapping table 304 entry for the allocated PID may be initialized to "empty," as expected by an AllocatePage operation. For example, when a FreePage operation is encountered, the mapping table 304 entry may be set to ZERO. For example, the LSS cleaner may resume garbage collecting the log from the GC offset (1004) read from the checkpoint.

In accordance with example techniques discussed herein, during recovery, all free mapping table 304 entries may be set to ZERO. For example, the rebuilt mapping table 304 may be scanned. For example, when a ZERO entry is encountered, it may be added to the free list, which may be managed as a stack (i.e., the first entry to be reused is the last one that is added to the list). In accordance with these example techniques, the low order PID's may be reused (as a preference in reuse), which may tend to keep the table size clustered and small (at least as a result of recovery). Further, a high water mark may be maintained in the mapping table, indicating the highest PID used so far. For example, when the free list is exhausted, PID's may be added from the unused part of the table, incrementing the high water mark.

Figure 11:
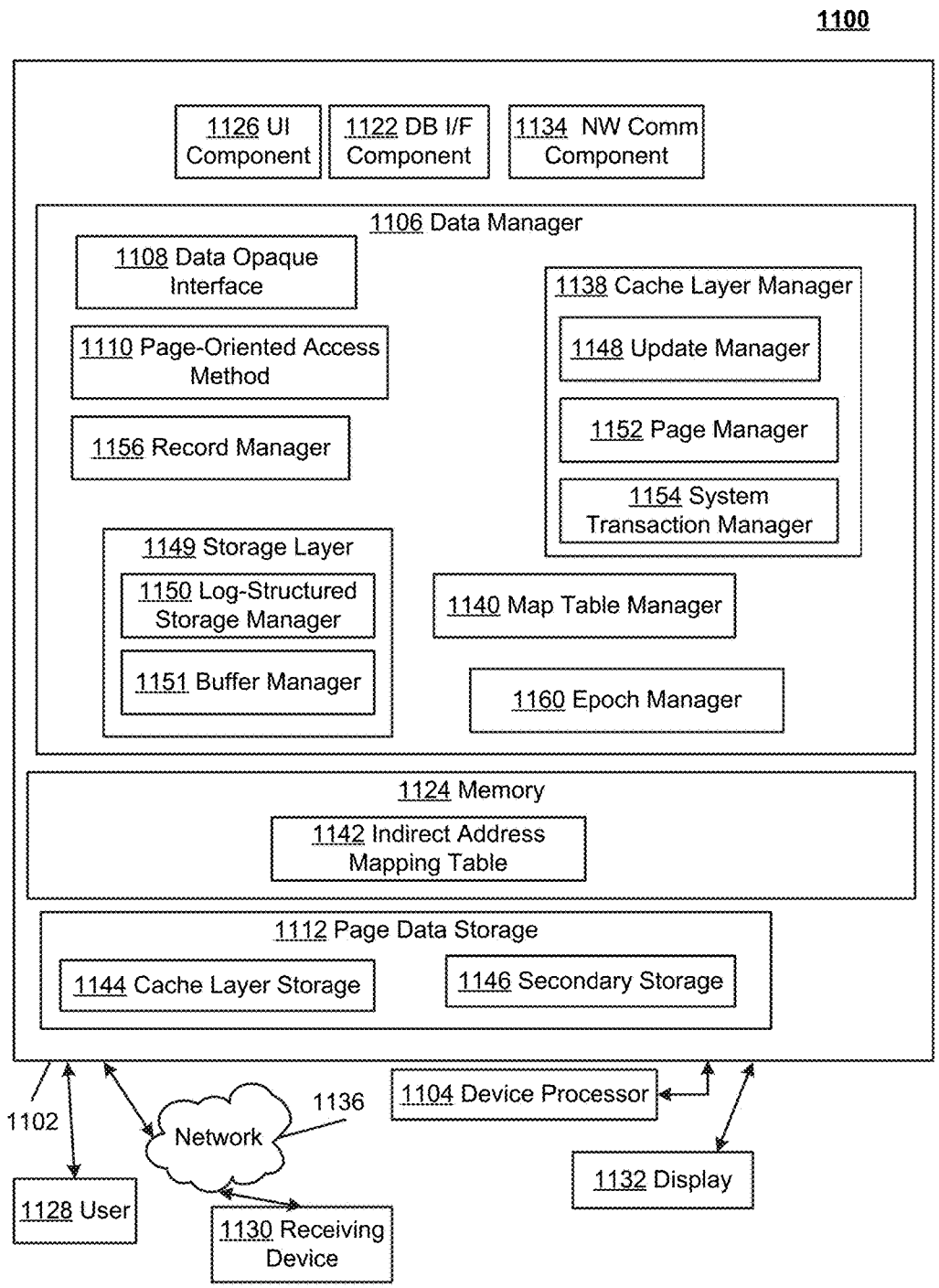
FIG. 11 is a block diagram of an example system for latch-free, log-structured storage for multiple access methods.

As further discussed herein, FIG. 11 is a block diagram of a system 1100 for managing latch-free and log-structured storage. One skilled in the art of data processing will appreciate that system 1100 may be realized in hardware implementations, software implementations, or combinations thereof. As shown in FIG. 11, a system 1100 may include a device 1102 that includes at least one processor 1104. The device 1102 may include a data manager 1106 that may include a data opaque interface 1108 that may be configured to provide, to an arbitrarily selected page-oriented access method 1110, interface access to page data storage 1112 that includes latch-free access to the page data storage 1112. For example, the page-oriented access method 1110 may be any arbitrary access method. For example, the page data storage 1112 may include any type of page data storage, including (at least) volatile storage such as main memory, and more stable storage (e.g., more non-volatile storage) such as "secondary storage," which may include flash storage, as well as other types of disk drives, etc. One skilled in the art of data processing will appreciate that there are many types of page data storage that may be used with techniques discussed herein, without departing from the spirit of the discussion herein.

According to an example embodiment, the data manager 1106, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a computing system. A processor may thus include one or more processors processing instructions in parallel and/or in a distributed manner. Although the device processor 1104 is depicted as external to the data manager 1106 in FIG. 11, one skilled in the art of data processing will appreciate that the device processor 1104 may be implemented as a single component, and/or as distributed units which may be located internally or externally to the data manager 1106, and/or any of its elements.

For example, the system 1100 may include one or more processors 1104. For example, the system 1100 may include at least one tangible computer-readable storage medium storing instructions executable by the one or more processors 1104, the executable instructions configured to cause at least one data processing apparatus to perform operations associated with various example components included in the system 1100, as discussed herein. For example, the one or more processors 1104 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the data manager 1106 may be implemented in association with one or more user devices. For example, the data manager 1106 may communicate with a server, as discussed further below.

For example, one or more databases may be accessed via a database interface component 1122. One skilled in the art of data processing will appreciate that there are many techniques for storing information discussed herein, such as various types of database configurations (e.g., relational databases, hierarchical databases, distributed databases) and non-database configurations.

According to an example embodiment, the data manager 1106 may include a memory 1124 that may store objects such as intermediate results. In this context, a "memory" may include a single memory device or multiple memory devices configured to store data and/or instructions. Further, the memory 1124 may span multiple distributed storage devices. Further, the memory 1124 may be distributed among a plurality of processors.

According to an example embodiment, a user interface component 1126 may manage communications between a user 1128 and the data manager 1106. The user 1128 may be associated with a receiving device 1130 that may be associated with a display 1132 and other input/output devices. For example, the display 1132 may be configured to communicate with the receiving device 1130, via internal device bus communications, or via at least one network connection.

According to example embodiments, the display 1132 may be implemented as a flat screen display, a print form of display, a two-dimensional display, a three-dimensional display, a static display, a moving display, sensory displays such as tactile output, audio output, and any other form of output for communicating with a user (e.g., the user 1128).

According to an example embodiment, the data manager 1106 may include a network communication component 1134 that may manage network communication between the data manager 1106 and other entities that may communicate with the data manager 1106 via at least one network 1136.

For example, the network 1136 may include at least one of the Internet, at least one wireless network, or at least one wired network. For example, the network 1136 may include a cellular network, a radio network, or any type of network that may support transmission of data for the data manager 1106. For example, the network communication component 1134 may manage network communications between the data manager 1106 and the receiving device 1130. For example, the network communication component 1134 may manage network communication between the user interface component 1126 and the receiving device 1130.

For example, the data opaque interface 1108 may be configured to provide, to the arbitrarily selected page-oriented access method 1110, interface access to page data storage 1112 that includes log structured access to the page data storage 1112.

For example, a cache layer manager 1138 may include a map table manager 1140 that may be configured to initiate table operations on an indirect address mapping table 1142 associated with the data opaque interface 1108, the table operations including initiating atomic compare and swap (CAS) operations on entries in the indirect address mapping table 1142, to replace prior states of pages that are associated with the page data storage 1112, with new states of the pages.

For example, the map table manager 1140 may be configured to initiate the table operations on the indirect address mapping table 1142 associated with the data opaque interface 1108, wherein the indirect address mapping table 1142 is used in common for management of data storage that includes cache layer storage 1144 and secondary storage 1146.

For example, the indirect address mapping table 1142 separates logical locations of pages from corresponding physical locations of the pages, wherein users of the page data storage store page identifier values in lieu of physical location address values for the pages, elsewhere in data structures referencing the page data storage.

For example, an update manager 1148 may be configured to control data updates and management updates using latch-free compare and swap operations on entries in the indirect address mapping table 1142 to effect atomic state changes on the indirect address mapping table 1142.

For example, a storage layer 1149 may include a log-structured storage layer manager 1150 that may be configured to control page location changes associated with log structuring resulting from page flushes, using latch-free compare and swap operations on entries in the indirect address mapping table 1142.

For example, a buffer manager 1151 may be configured to control updates to a log-structured secondary storage buffer via latch-free update operations. Thus, for example, multiple threads may simultaneously update the log-structured secondary storage buffer via latch-free operations.

For example, the buffer manager 1151 may be configured to initiate a stability operation for determining that pages flushed to the log-structured secondary storage buffer, having lower addresses, up to a first secondary storage address argument, are stable in the log-structured secondary storage.

For example, a page manager 1152 may be configured to control flush operations, allocate operations, and free operations on pages. For example, the page manager 1152 may be configured to initiate a flush operation of a first page in cache layer storage to a location in secondary storage, based on initiating a copy of a page state of the first page into a secondary storage buffer, initiating a prepending of a flush delta record to the page state, the flush delta record including a secondary storage address indicating a storage location of the first page in secondary storage and an annotation associated with a caller, and initiating an update to the page state based on installing an address of the flush delta record in a mapping table, via a compare and swap (CAS) operation.

For example, the page manager 1152 may be configured to initiate a swap operation of a portion of a first page in cache layer storage to a location in secondary storage, based on initiating a prepending of a partial swap delta record to a page state associated with the first page, the partial swap delta record including a main memory address indicating a storage location of a flush delta record that indicates a location in secondary storage of a missing part of the first page.

For example, a system transaction manager 1154 may be configured to commit transactions and abort transactions.

For example, a record manager 1156 may be configured to control updates based on update delta record operations and replacement update operations.

For example, an epoch manager 1160 may be configured to initiate enrollment of a first processor operation in a first epoch enrollment list associated with a first epoch, prior to accessing page information by the first processor operation. For example, the first processor operation may be a thread.

For example, the page manager 1152 may be configured to flush a page state to secondary storage based on installing a pointer to a flush delta record in a mapping table, via a compare and swap (CAS) operation, the flush delta record prepended to an existing page state that is replaced in the mapping table via the CAS operation.

For example, the page manager 1152 may be configured to determine whether the CAS operation succeeds, and to initiate a write operation to write the existing page state to a secondary storage flush buffer, if it is determined that the CAS operation succeeds.

For example, the page manager 1152 may be configured to initiate a void operation to storage space previously allocated for the existing page, if it is determined that the CAS operation fails.

One skilled in the art of data processing will appreciate that many different techniques may be used for latch-free, log-structured storage systems, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 12A:
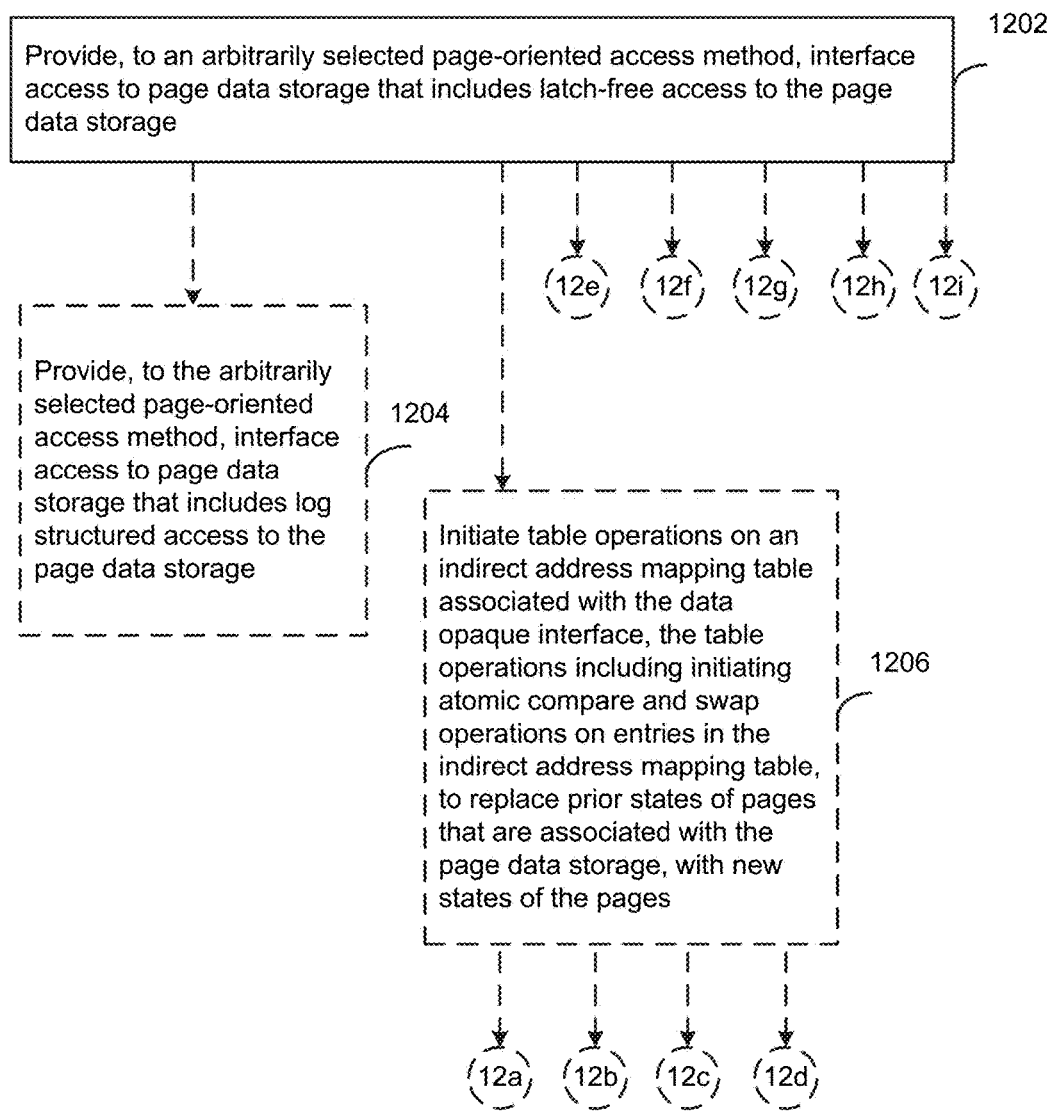
FIGS. 12A-12D are a flowchart illustrating example operations of the system of FIG. 11.

FIGS. 12A-12D are a flowchart illustrating example operations of the system of FIG. 11, according to example embodiments. In the example of FIG. 12A, interface access to page data storage that includes latch-free access to the page data storage, may be provided, to an arbitrarily selected page-oriented access method (1202). For example, the data opaque interface 1108 that may provide, to an arbitrarily selected page-oriented access method 1110, interface access to page data storage 1112 that includes latch-free access to the page data storage 1112, as discussed above.

For example, the interface access to page data storage may include log structured access to the stable page data storage (1204). For example, the data opaque interface 1108 may provide, to the arbitrarily selected page-oriented access method 1110, interface access to page data storage 1112 that includes log structured access to the page data storage 1112, as discussed above.

For example, table operations may be initiated on an indirect address mapping table associated with the data opaque interface, the table operations including initiating atomic compare and swap operations on entries in the indirect address mapping table, to replace prior states of pages that are associated with the page data storage, with new states of the pages (1206). For example, the map table manager 1140 may initiate table operations on an indirect address mapping table 1142 associated with the data opaque interface 1108, the table operations including initiating atomic compare and swap (CAS) operations on entries in the indirect address mapping table 1142, to replace prior states of pages that are associated with the page data storage 1112, with new states of the pages, as discussed above.

Figure 12B:
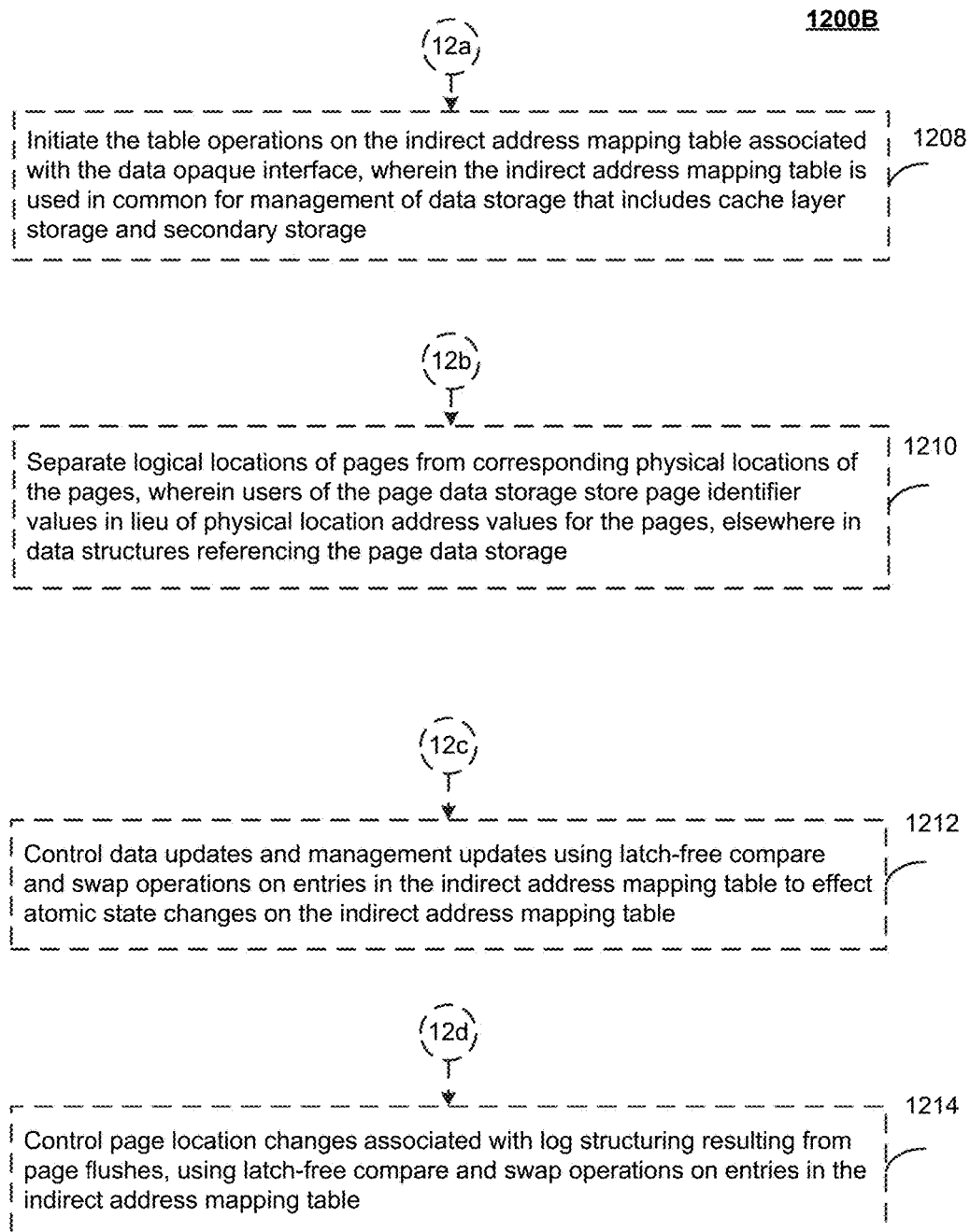

For example, the indirect address mapping table may be used in common for management of data storage that includes cache layer storage and secondary storage (1208), as indicated in FIG. 12B. For example, the map table manager 1140 may initiate the table operations on the indirect address mapping table 1142 associated with the data opaque interface 1108, wherein the indirect address mapping table 1142 is used in common for management of data storage that includes cache layer storage 1144 and secondary storage 1146, as discussed above.

For example, logical locations of pages may be separated from corresponding physical locations of the pages, wherein users of the page data storage store page identifier values in lieu of physical location address values for the pages, elsewhere in data structures referencing the page data storage (1210). For example, the indirect address mapping table 1142 separates logical locations of pages from corresponding physical locations of the pages, wherein users of the page data storage store page identifier values in lieu of physical location address values for the pages, elsewhere in data structures referencing the page data storage, as discussed above.

For example, data updates and management updates may be controlled using latch-free compare and swap operations on entries in the indirect address mapping table to effect atomic state changes on the indirect address mapping table (1212). For example, the update manager 1148 may control data updates and management updates using latch-free compare and swap operations on entries in the indirect address mapping table 1142 to effect atomic state changes on the indirect address mapping table 1142, as discussed above.

For example, page location changes associated with log structuring resulting from page flushes may be controlled, using latch-free compare and swap operations on entries in the indirect address mapping table (1214). For example, the log-structured storage layer manager 1150 may control page location changes associated with log structuring resulting from page flushes, using latch-free compare and swap operations on entries in the indirect address mapping table 1142, as discussed above.

Figure 12C:
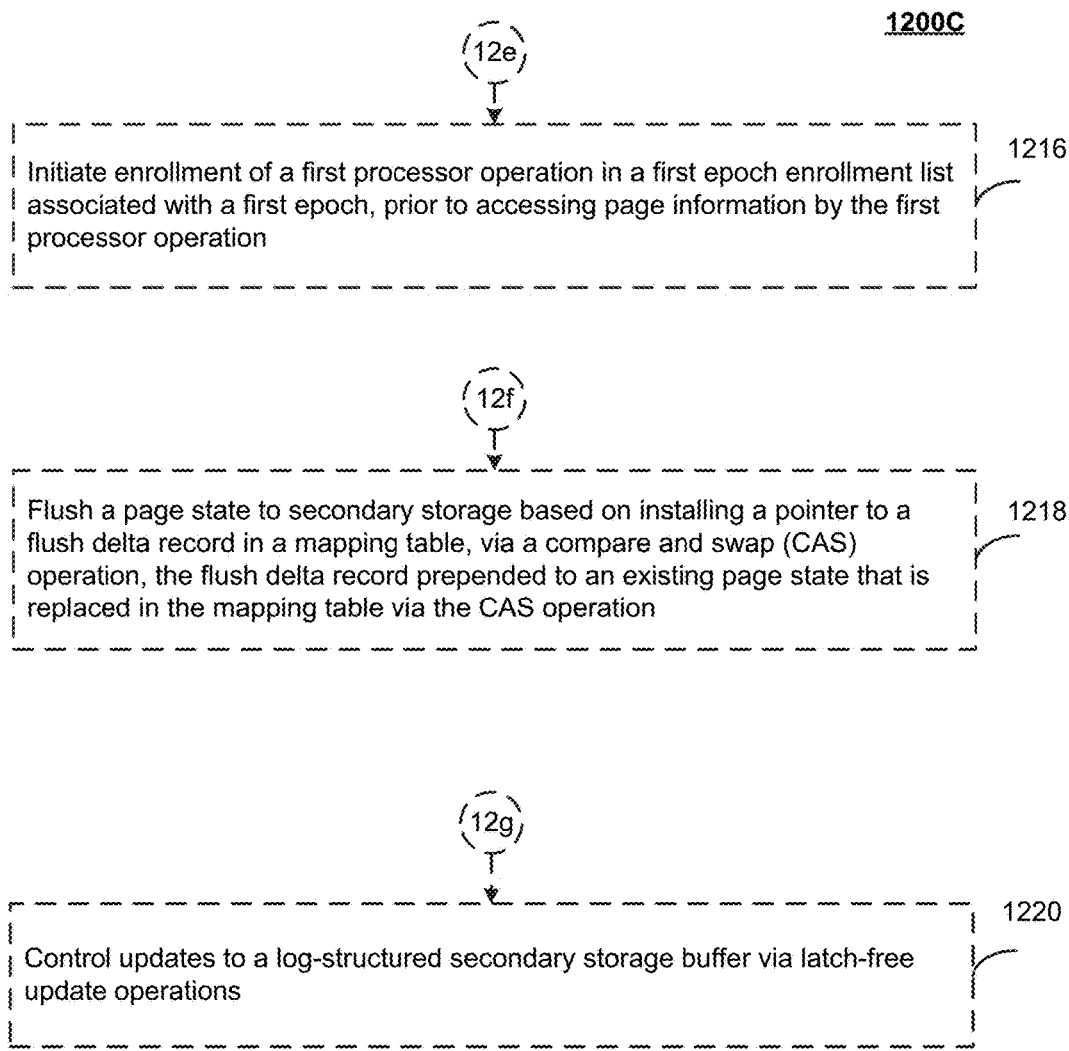

For example, enrollment of a first processor operation in a first epoch enrollment list associated with a first epoch may be initiated, prior to accessing page information by the first processor operation (1216), in the example of FIG. 12C.

For example, a page state may be flushed to secondary storage based on installing a pointer to a flush delta record in a mapping table, via a compare and swap (CAS) operation, the flush delta record prepended to an existing page state that is replaced in the mapping table via the CAS operation (1218).

For example, updates to a log-structured secondary storage buffer may be controlled via latch-free update operations (1220).

Figure 12D:
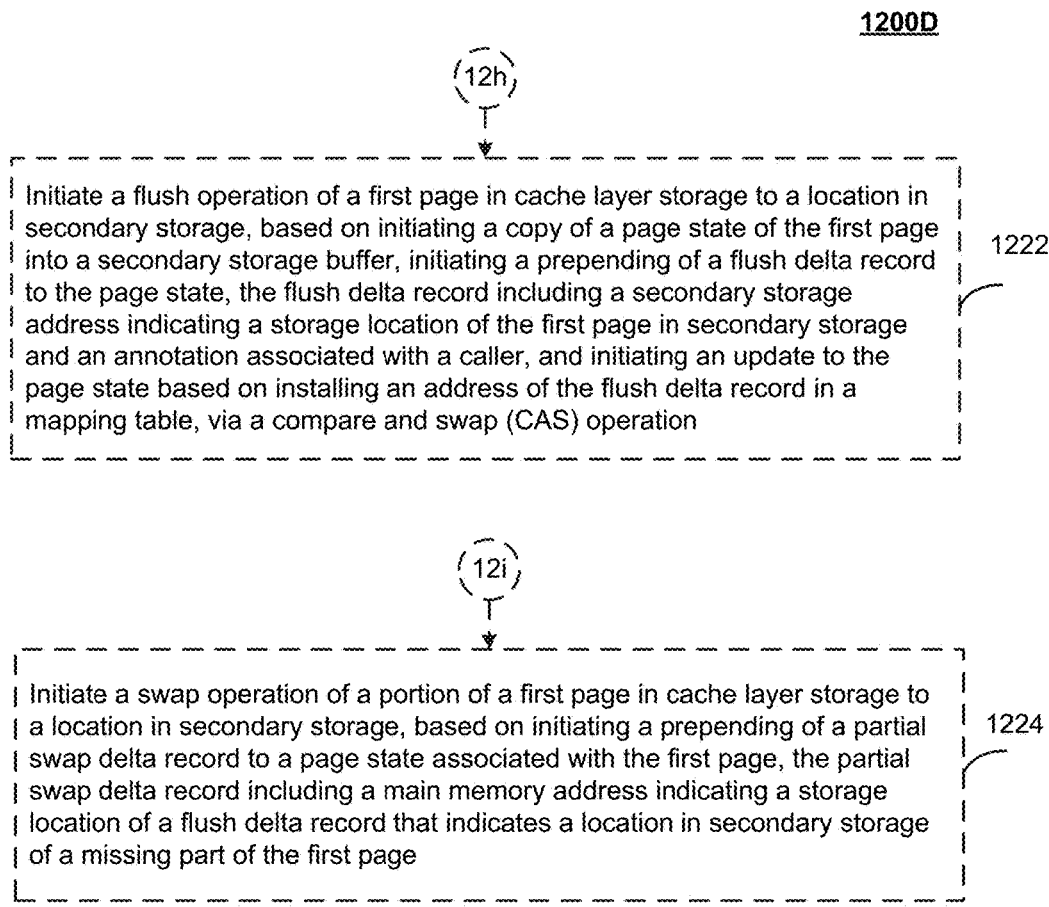

For example, a flush operation of a first page in cache layer storage to a location in secondary storage may be initiated, based on initiating a copy of a page state of the first page into a secondary storage buffer, initiating a prepending of a flush delta record to the page state, the flush delta record including a secondary storage address indicating a storage location of the first page in secondary storage and an annotation associated with a caller, and initiating an update to the page state based on installing an address of the flush delta record in a mapping table, via a compare and swap (CAS) operation (1222), in the example of FIG. 12D.

For example, a swap operation of a portion of a first page in cache layer storage to a location in secondary storage may be initiated, based on initiating a prepending of a partial swap delta record to a page state associated with the first page, the partial swap delta record including a main memory address indicating a storage location of a flush delta record that indicates a location in secondary storage of a missing part of the first page (1224).

One skilled in the art of data processing will understand that there may be many different techniques may be used for latch-free, log-structured storage systems, without departing from the spirit of the discussion herein.

Customer privacy and confidentiality have been ongoing considerations in data processing environments for many years. Thus, example techniques for latch-free, log-structured storage systems may use user input and/or data provided by users who have provided permission via one or more subscription agreements (e.g., "Terms of Service" (TOS) agreements) with associated applications or services associated with such analytics. For example, users may provide consent to have their input/data transmitted and stored on devices, though it may be explicitly indicated (e.g., via a user accepted agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a memory device;
a secondary storage device; and
a processor configured via executable instructions to:
store a page of data in the memory device, the page comprising a first portion and a second portion;
modify a log-structured store on the secondary storage device to reflect an update to a first portion of the page of data;
reclaim memory from the memory device by removing the first portion of the page from the memory device while retaining the second portion of the page in the memory device; and
retrieve the first portion of the page using the log-structured store on the secondary storage device and store the first portion of the page in the memory device, the first portion of the page being retrieved into the memory device while the second portion of the page remains in the memory device.

2. The system of claim 1, the processor being further configured via the executable instructions to:
while the first portion of the page is removed from the memory device, receive a request to read the page; and
use the log-structured store to retrieve the first portion of the page into the memory device responsive to the request to read the page.

3. The system of claim 1, the processor being further configured via the executable instructions to:
maintain a mapping table identifying different physical addresses of different pages of data, the different physical addresses including memory addresses on the memory device and secondary storage addresses on the secondary storage device.

4. The system of claim 1, the secondary storage device being a flash storage device.

5. The system of claim 4, the memory device being a random access memory device.

6. A method comprising:
maintaining a mapping table that maps pages of data to addresses on a memory device and a storage device;
flushing a first portion of a selected page to the storage device; and
after the first portion of the selected page has been flushed, reclaiming memory from the memory device occupied by the first portion of the selected page while a second portion of the selected page remains allocated in the memory device,
the reclaiming comprising modifying the mapping table to reflect that the memory has been reclaimed.

7. The method of claim 6, wherein modifying the mapping table comprises inserting a partial swap delta record into the mapping table.

8. The method of claim 7, further comprising:
storing, on the storage device, a flush delta record identifying a storage address where the first portion of the selected page is stored on the storage device,
the partial swap delta record in the mapping table pointing to the flush delta record on the storage device.

9. The method of claim 6, the reclaiming comprising:
freeing one or more addresses on the memory device where the first portion of the selected page is stored prior to the reclaiming.

10. The method of claim 6, further comprising:
storing the first portion of the selected page and a third portion of the selected page in different storage blocks on the storage device.

11. The method of claim 10, further comprising:
linking at least the first portion of the selected page to the third portion in a log-structured store on the storage device.

12. The method of claim 10, further comprising:
reading the entire page into memory by retrieving the first portion and the third portion from the different storage blocks.

13. The method of claim 6, wherein the modifying the mapping table is performed without obtaining a latch.

14. A hardware computer-readable storage medium storing instructions which, when executed by a processor, cause the processor to perform acts comprising:
maintaining a mapping table that maps pages of data to physical addresses where the pages are stored in memory and on secondary storage;
flushing a first portion of a selected page from the memory to the secondary storage; and after the first portion of the selected page has been flushed, reclaiming at least some of the memory that was used to store the first portion of the selected page while a second portion of the selected page remains allocated in the memory, wherein the reclaiming comprises modifying the mapping table to indicate that the at least some of the memory used to store the first portion of the selected page has been reclaimed.

15. The hardware computer-readable storage medium of claim 14, the acts further comprising:

flushing the first portion of the selected page responsive to a request identifying the selected page, the request identifying a delta relative to a previous page state of the selected page.

16. The hardware computer-readable storage medium of claim 15, the acts further comprising:

returning to the request without ensuring that the delta is stable on the secondary storage.

17. The hardware computer-readable storage medium of claim 15, the acts further comprising:

storing a record on the secondary storage that identifies a particular address where the delta resides.

18. The hardware computer-readable storage medium of claim 17, the acts further comprising:

storing, in the mapping table, another address of the record on the secondary storage.

19. The hardware computer-readable storage medium of claim 14, the acts further comprising:

responsive to a request received after the reclaiming, retrieving the first portion of the selected page from the secondary storage and loading the first portion of the selected page into the memory.

20. The hardware computer-readable storage medium of claim 14, the acts further comprising:

storing links chaining multiple different portions of the selected page together on the secondary storage; and retrieving the selected page into memory by following the links.

* * * * *